United States Patent
Sakagawa et al.

(10) Patent No.: US 11,548,580 B2
(45) Date of Patent: Jan. 10, 2023

(54) TELESCOPIC APPARATUS FOR HUMAN-POWERED VEHICLE

(71) Applicant: SHIMANO INC., Sakai (JP)

(72) Inventors: Yuki Sakagawa, Sakai (JP); Toyoto Shirai, Sakai (JP)

(73) Assignee: SHIMANO INC., Sakai (JP)

(*) Notice: Subject to any disclaimer, the term of this patent is extended or adjusted under 35 U.S.C. 154(b) by 502 days.

(21) Appl. No.: 16/737,829

(22) Filed: Jan. 8, 2020

(65) Prior Publication Data

US 2021/0206443 A1 Jul. 8, 2021

(51) Int. Cl.
| | |
|---|---|
| *B62J 1/08* | (2006.01) |
| *B62K 19/00* | (2006.01) |
| *B62K 23/02* | (2006.01) |
| *F16K 31/524* | (2006.01) |
| *F15B 13/02* | (2006.01) |
| *F16K 31/04* | (2006.01) |
| *B62K 19/36* | (2006.01) |

(52) U.S. Cl.
CPC ............ *B62J 1/08* (2013.01); *B62K 19/00* (2013.01); *B62K 23/02* (2013.01); *F15B 13/021* (2013.01); *F16K 31/047* (2013.01); *F16K 31/52408* (2013.01); *B62J 2001/085* (2013.01); *B62K 19/36* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,673,936 B2* | 3/2010 | Hsu | ........ | B62K 19/36 |
| | | | | 297/215.13 |
| 8,177,251 B2* | 5/2012 | Shirai | ........ | B62J 1/08 |
| | | | | 280/288.4 |
| 9,073,592 B2* | 7/2015 | Hsu | ........ | B62J 1/06 |
| 9,126,647 B2* | 9/2015 | Kuo | ........ | F16F 9/064 |
| 9,487,256 B2* | 11/2016 | Hsu | ........ | B62J 1/08 |
| 9,540,063 B1* | 1/2017 | Shirai | ........ | B62J 1/08 |
| 9,580,123 B2* | 2/2017 | Shirai | ........ | B62J 1/06 |
| 9,969,448 B1* | 5/2018 | Chen | ........ | B62J 1/10 |
| 10,131,391 B2* | 11/2018 | Shirai | ........ | B62J 1/08 |
| 10,472,012 B2* | 11/2019 | Shirai | ........ | B62J 1/28 |

(Continued)

FOREIGN PATENT DOCUMENTS

| | | |
|---|---|---|
| DE | 20 2015 104 354 U1 | 8/2015 |
| DE | 102018102955 A1 * | 8/2018 ........ B62J 1/08 |
| EP | 2457811 B1 | 5/2012 |

*Primary Examiner* — Monica E Millner
(74) *Attorney, Agent, or Firm* — Mori & Ward, LLP

(57) ABSTRACT

A telescopic apparatus for a human-powered vehicle comprises a first hydraulic chamber, a second hydraulic chamber, a valve member, a cam member, and an actuator. The second hydraulic chamber is configured to be in fluid communication with the first hydraulic chamber. The valve member is configured to control a fluid communication between the first hydraulic chamber and the second hydraulic chamber. The cam member is rotatable about a rotational axis to move the valve member in a movement direction. The actuator is configured to rotate the cam member. The actuator includes an output shaft rotatable about an actuation rotational axis. The actuation rotational axis is offset from the rotational axis as viewed in the movement direction.

18 Claims, 17 Drawing Sheets

(56) References Cited

U.S. PATENT DOCUMENTS

| | | | |
|---|---|---|---|
| 10,604,201 B2* | 3/2020 | Shirai | F16B 7/10 |
| 10,759,484 B2* | 9/2020 | Chen | B62J 1/08 |
| 10,780,932 B2* | 9/2020 | Shirai | B62J 1/08 |
| 2012/0228906 A1* | 9/2012 | McAndrews | F16B 7/1409 |
| | | | 74/493 |
| 2016/0355225 A1* | 12/2016 | Shirai | B62J 1/08 |
| 2017/0096184 A1* | 4/2017 | Hara | B62M 9/12 |
| 2017/0096186 A1 | 4/2017 | Lai | |
| 2017/0225734 A1* | 8/2017 | Shirai | B62J 1/28 |
| 2017/0341692 A1* | 11/2017 | Shirai | B62K 19/36 |
| 2018/0186419 A1 | 7/2018 | Shipman et al. | |
| 2018/0244330 A1 | 8/2018 | Shirai | |
| 2019/0193802 A1* | 6/2019 | Hara | G08C 17/00 |
| 2019/0300085 A1* | 10/2019 | Shirai | H01L 41/0986 |
| 2020/0079453 A1* | 3/2020 | Sakagawa | B62K 19/36 |

\* cited by examiner

TELESCOPIC APPARATUS FOR HUMAN-POWERED VEHICLE

BACKGROUND OF THE INVENTION

Field of the Invention

The present invention relates to a telescopic apparatus for a human-powered vehicle.

Discussion of the Background

A human-powered vehicle includes a telescopic device including a first tubular body and a second tubular body telescopically coupled to the first tubular body.

SUMMARY OF THE INVENTION

In accordance with a first aspect of the present invention, a telescopic apparatus for a human-powered vehicle comprises a first hydraulic chamber, a second hydraulic chamber, a valve member, a cam member, and an actuator. The second hydraulic chamber is configured to be in fluid communication with the first hydraulic chamber. The valve member is configured to control a fluid communication between the first hydraulic chamber and the second hydraulic chamber. The cam member is rotatable about a rotational axis to move the valve member in a movement direction. The actuator is configured to rotate the cam member. The actuator includes an output shaft rotatable about an actuation rotational axis. The actuation rotational axis is offset from the rotational axis as viewed in the movement direction.

With the telescopic apparatus according to the first aspect, it is possible to improve flexibility of arrangement of the actuator and the cam member. Thus, it is possible to make the telescopic apparatus including the actuator more compact.

In accordance with a second aspect of the present invention, the telescopic apparatus according to the first aspect is configured so that at least one of the rotational axis and the actuation rotational axis extends along the movement direction.

With the telescopic apparatus according to the second aspect, it is possible to simplify the structure of the telescopic apparatus.

In accordance with a third aspect of the present invention, a telescopic apparatus for a human-powered vehicle comprises a first hydraulic chamber, a second hydraulic chamber, a valve member, a cam follower, and a cam member. The second hydraulic chamber is configured to be in fluid communication with the first hydraulic chamber. The valve member is configured to control a fluid communication between the first hydraulic chamber and the second hydraulic chamber. The cam follower is coupled to the valve member so as to move the valve member. The cam member is rotatable about a rotational axis to guide the cam follower in a movement direction. The cam member includes a plurality of cam surfaces configured to arrange the cam follower in one of a first position, a second position, and a third position.

With the telescopic apparatus according to the third aspect, it is possible to arrange the cam follower in each of the first position, the second position, and the third position. Thus, it is possible to arrange another member coupled to the cam follower in each of the first position, the second position, and the third position.

In accordance with a fourth aspect of the present invention, the telescopic apparatus according to the second aspect is configured so that the plurality of cam surfaces circumferentially extends about the rotational axis as viewed in the movement direction.

With the telescopic apparatus according to the fourth aspect, it is possible to arrange the cam follower in each of the first position, the second position, and the third position by using rotation of the cam member.

In accordance with a fifth aspect of the present invention, the telescopic apparatus according to the second or fourth aspect is configured so that the plurality of cam surfaces includes a first cam surface. The first cam surface is configured to be in contact with the cam follower so as to arrange the cam follower in the first position.

With the telescopic apparatus according to the fifth aspect, it is possible to arrange the cam follower in the first position using the cam member.

In accordance with a sixth aspect of the present invention, the telescopic apparatus according to the fifth aspect is configured so that the plurality of cam surfaces includes a second cam surface different from the first cam surface. The second cam surface is configured to be in contact with the cam follower so as to arrange the cam follower in the second position.

With the telescopic apparatus according to the sixth aspect, it is possible to arrange the cam follower in the second position using the cam member.

In accordance with a seventh aspect of the present invention, the telescopic apparatus according to the sixth aspect is configured so that the plurality of cam surfaces includes a third cam surface configured to be in contact with the cam follower so as to arrange the cam follower in the third position. The first cam surface circumferentially extends from the third cam surface in a first circumferential direction as viewed in the movement direction. The second cam surface circumferentially extends from the third cam surface in a second circumferential direction as viewed in the movement direction. The second circumferential direction is an opposite direction of the first circumferential direction.

With the telescopic apparatus according to the seventh aspect, it is possible to arrange the cam follower in each of the first position, the second position, and the third position by using rotation of the cam member.

In accordance with an eighth aspect of the present invention, the telescopic apparatus according to the seventh aspect is configured so that the cam member includes a tubular body rotatable relatively about the rotational axis. The first cam surface, the second cam surface, and the third cam surface are provided on an axial end of the tubular body.

With the telescopic apparatus according to the eighth aspect, it is possible to simplify the structure of the cam member.

In accordance with a ninth aspect of the present invention, the telescopic apparatus according to the eighth aspect is configured so that the cam member includes a first stopper extending from the axial end of the tubular body. The first stopper is configured to be in contact with the cam follower to stop the cam follower in the first position.

With the telescopic apparatus according to the ninth aspect, it is possible to reliably stop the cam follower at the first position.

In accordance with a tenth aspect of the present invention, the telescopic apparatus according to the eighth or ninth aspect is configured so that the cam member includes a second stopper extending from the axial end of the tubular body. The second stopper is configured to be in contact with the cam follower to stop the cam follower in the second position.

With the telescopic apparatus according to the tenth aspect, it is possible to reliably stop the cam follower at the second position.

In accordance with an eleventh aspect of the present invention, the telescopic apparatus according to any one of the third to tenth aspects is configured so that a first distance defined between the first position and the third position in the movement direction is shorter than a second distance defined between the second position to the third position in the movement direction.

With the telescopic apparatus according to the eleventh aspect, it is possible to arrange the cam follower in each of the first position, the second position, and the third position which are different positions from each other.

In accordance with a twelfth aspect of the present invention, the telescopic apparatus according to any one of the first to eleventh aspects is configured so that the valve member includes a rod body extending along the movement direction. The cam follower protrudes radially outwardly from the rod body.

With the telescopic apparatus according to the twelfth aspect, it is possible to simplify the structures of the cam follower and the valve member.

In accordance with a thirteenth aspect of the present invention, the telescopic apparatus according to any one of the first to twelfth aspects is configured so that the actuator includes a base member. The base member is configured to accommodate at least a part of the cam member and at least a part of the valve member.

With the telescopic apparatus according to the thirteenth aspect, it is possible to stabilize motion of the cam member and/or the valve member.

In accordance with a fourteenth aspect of the present invention, the telescopic apparatus according to the thirteenth aspect is configured so that the base member includes a base member surface configured to be at least partially in contact with the valve member. The valve member includes a valve member surface configured to be at least partially in contact with the base member surface such that a rotation of the valve member relative to the base member is restricted.

With the telescopic apparatus according to the fourteenth aspect, it is possible to suppress or restrict a rotation of the valve member relative to the base member about the rotational axis. Thus, it is possible to stabilize relative motion between the cam member and the valve member.

In accordance with a fifteenth aspect of the present invention, the telescopic apparatus according to the fourteenth aspect is configured so that the base member surface includes a base member flat surface. The valve member surface includes a valve member flat surface configured to be in contact with the base member flat surface.

With the telescopic apparatus according to the fifteenth aspect, it is possible to reliably suppress or restrict the rotation of the valve member relative to the base member about the rotational axis.

In accordance with a sixteenth aspect of the present invention, the telescopic apparatus according to any one of the first to fifteenth aspects further comprises a controller configured to control the cam member so as to rotate in response to a user input.

With the telescopic apparatus according to the sixteenth aspect, it is possible to improve flexibility of control of the cam member.

In accordance with a seventeenth aspect of the present invention, the telescopic apparatus according to the sixteenth aspect is configured so that the cam member is rotatable relatively about the rotational axis from an initial position to a first actuated position to move the cam member from the third position to the first position. The controller is configured to control the cam member so as to rotate from the initial position to the first actuated position in response to a first user input.

With the telescopic apparatus according to the seventeenth aspect, it is possible to move the cam follower from the initial position to the first actuator position using the first user input.

In accordance with an eighteenth aspect of the present invention, the telescopic apparatus according to the sixteenth or seventeenth aspect is configured so that the cam member is rotatable relatively about the rotational axis from the initial position to a second actuated position to move the cam member from the third position to the second position. The controller is configured to control the cam member so as to rotate from the initial position to the second actuated position in response to a second user input.

With the telescopic apparatus according to the eighteenth aspect, it is possible to move the cam follower from the initial position to the second actuator position using the second user input.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
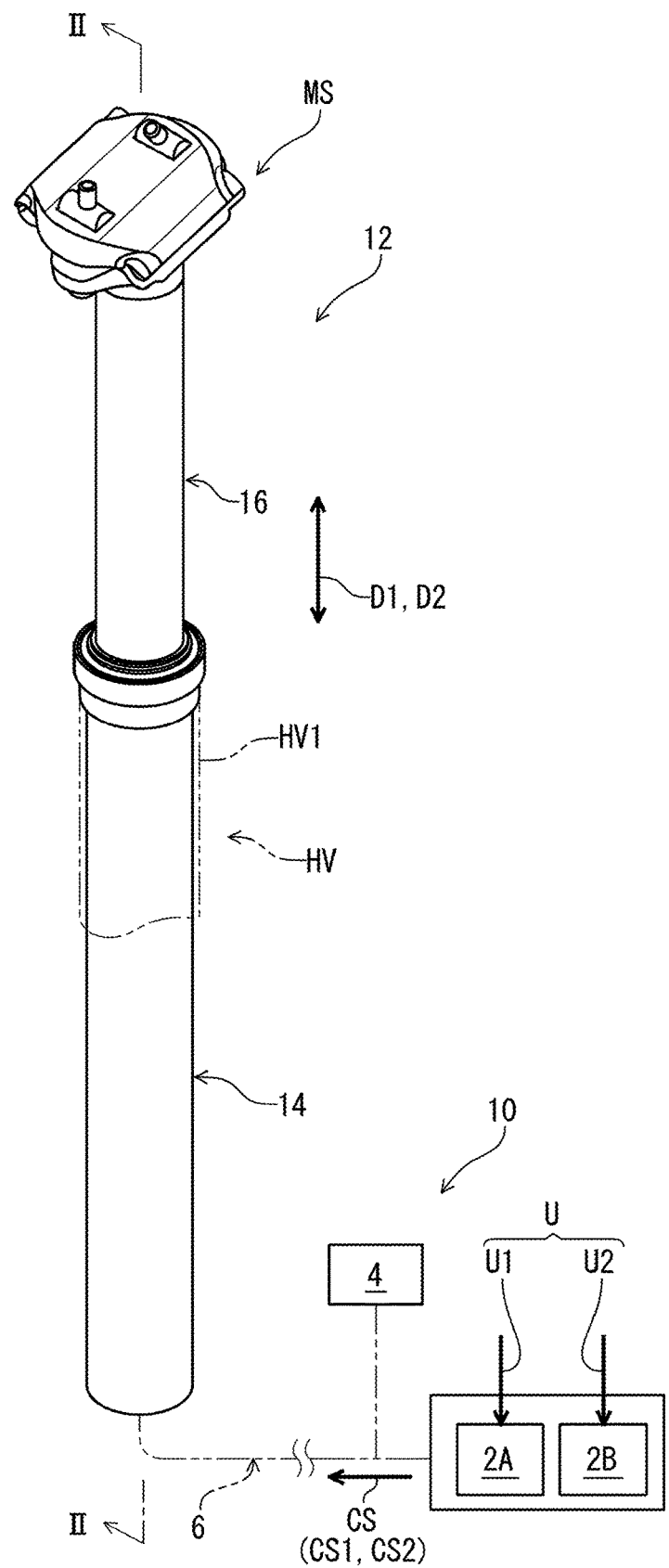
FIG. 1 is a perspective view of a telescopic apparatus in accordance with an embodiment, with a schematic block diagram of a telescopic actuation system.

The embodiment(s) will now be described with reference to the accompanying drawings, wherein like reference numerals designate corresponding or identical elements throughout the various drawings.

As seen in FIG. 1, a telescopic actuation system 10 includes a telescopic apparatus 12. The telescopic apparatus 12 for a human-powered vehicle HV comprises a first tube 14 and a second tube 16. The second tube 16 is telescopically and movably coupled to the first tube 14. The first tube 14 and the second tube 16 are movable relative to each other in a telescopic direction D1. The telescopic apparatus 12 further comprises a saddle mounting structure MS to fixedly mount a saddle to one of the first tube 14 and the second tube 16. In this embodiment, the saddle mounting structure MS is attached to the second tube 16 to fixedly mount the saddle to the second tube 16. The first tube 14 is configured to be mounted to a vehicle body HV1 of the human-powered vehicle HV. However, the saddle mounting structure MS can be attached to the first tube 14 to fixedly mount the saddle to the first tube 14. In such an embodiment, the second tube 16 is configured to be mounted to the vehicle body HV1 of the human-powered vehicle HV.

Figure 2:
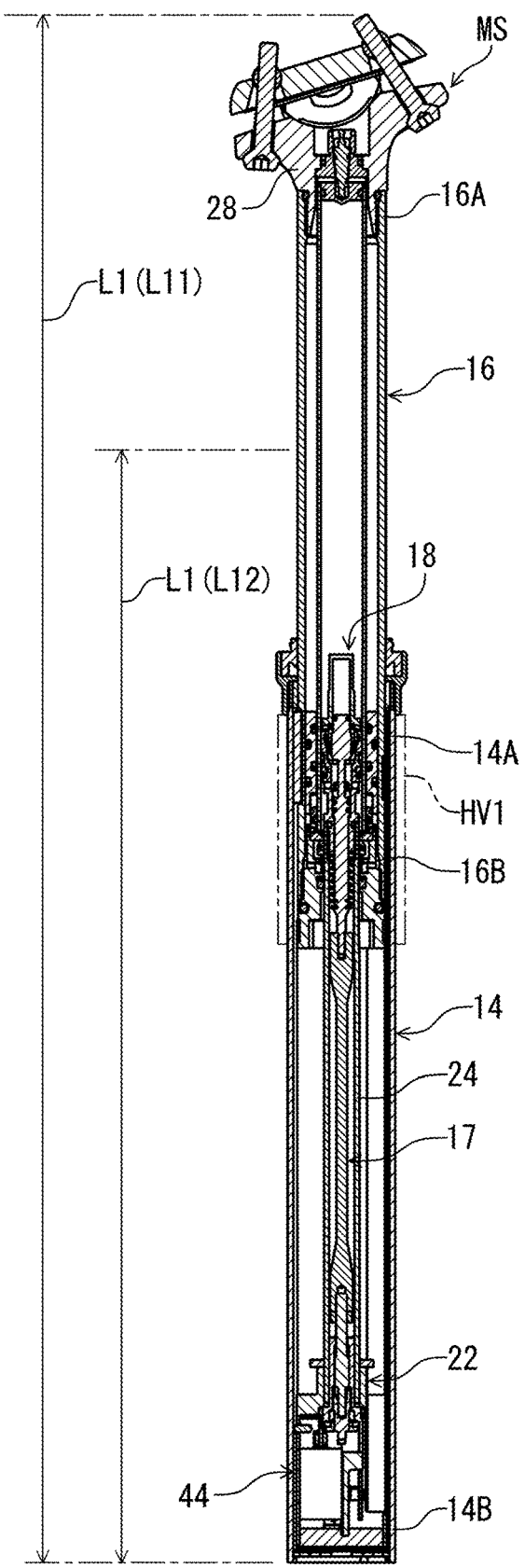
FIG. 2 is a cross-sectional view of the telescopic apparatus taken along line II-II of FIG. 1, with the schematic block diagram of the telescopic actuation system.

As seen in FIG. 2, the second tube 16 is telescopically coupled to the first tube 14 to vary a total length L1 of the telescopic apparatus 12. The telescopic apparatus 12 has a maximum total length L11 and a minimum total length L12. The first tube 14 includes a first end 14A and a first opposite end 14B. The first tube 14 extends between the first end 14A and the first opposite end 14B. The second tube 16 includes a second end 16A and a second opposite end 16B. The second tube 16 extends between the second end 16A and the second opposite end 16B. The second opposite end 16B is provided in the first tube 14. The first tube 14 is configured to be detachably attached to the vehicle body HV1 of the human-powered vehicle HV. In this embodiment, the first end 14A is an upper end of the first tube 14 in a mounting state where the telescopic apparatus 12 is mounted to the vehicle body HV1 of the human-powered vehicle HV. The second end 16A is an upper end of the second tube 16 in the mounting state of the telescopic apparatus 12. The telescopic apparatus 12 is a height adjustable seatpost assembly. However, the telescopic apparatus 12 can be other devices such as a suspension.

For example, the human-powered vehicle HV is a vehicle to travel with a motive power including at least a human power of a user who rides the human-powered vehicle HV (i.e., rider). The human-powered vehicle HV has an arbitrary number of wheels. For example, the human-powered vehicle HV has at least one wheel. In this embodiment, the human-powered vehicle HV preferably has a smaller size than that of a four-wheeled automobile. However, the human-powered vehicle HV can have an arbitrary size. For example, the human-powered vehicle HV can have a larger size than that of the four-wheeled automobile. Examples of the human-powered vehicle HV include a bicycle, a tricycle, and a kick scooter. In this embodiment, the human-powered vehicle HV is a bicycle. An electric assisting system including an electric motor can be applied to the human-powered vehicle HV (e.g., the bicycle) to assist muscular motive power of the user. Namely, the human-powered vehicle HV can be an E-bike.

In the present application, the following directional terms "forward," "rearward," "left," "right," "upward," and "downward" as well as any other similar directional terms refer to those directions which are determined on the basis of the rider who sits on a saddle or seat of the human-powered vehicle HV with facing a steering or handlebar. Accordingly, these terms, as utilized to describe the telescopic apparatus 12, should be interpreted relative to the human-powered vehicle HV equipped with the telescopic apparatus 12 as used in an upright riding position on a horizontal surface.

Figure 3:
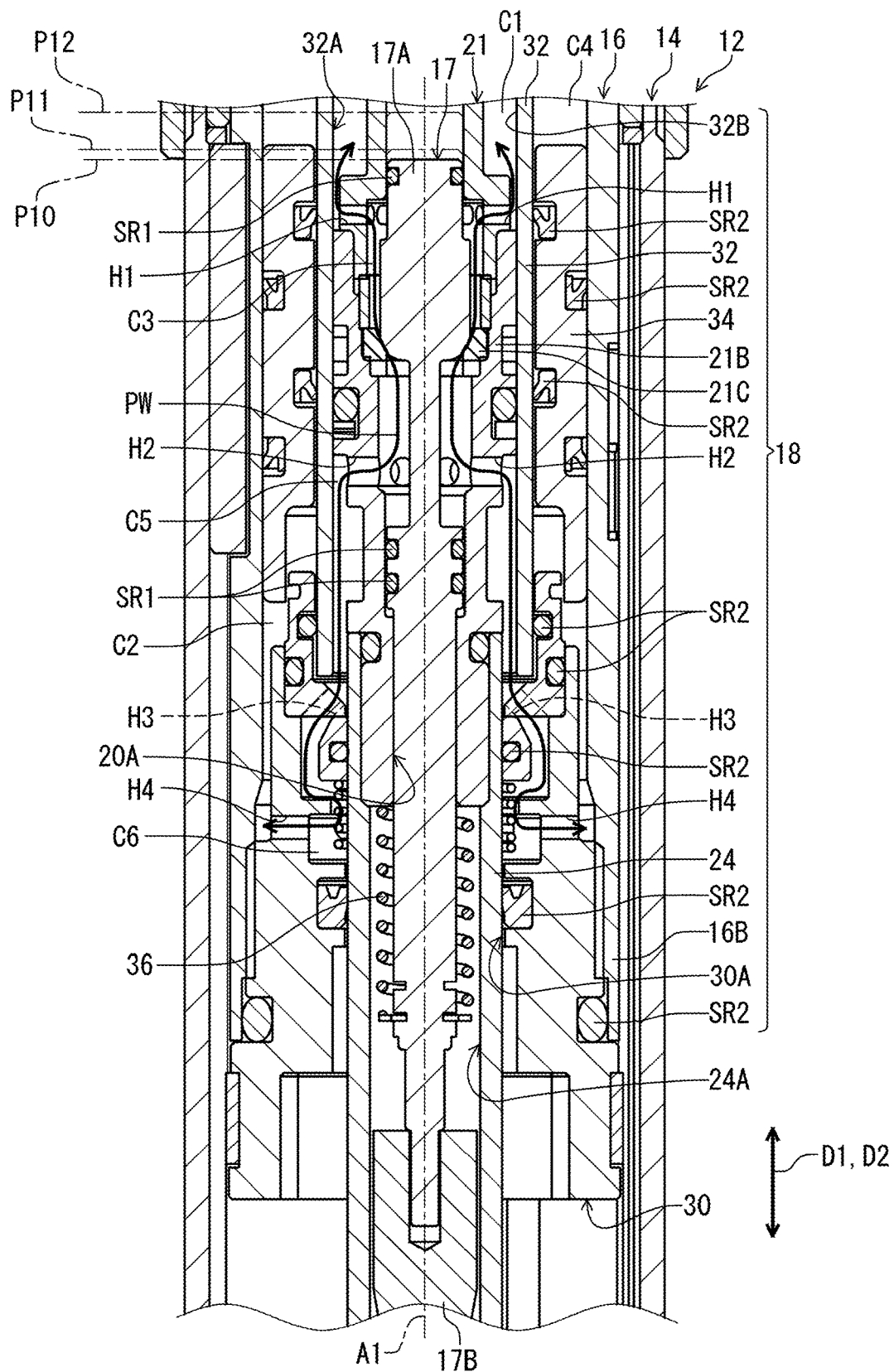
FIG. 3 is a partial cross-sectional view of the telescopic apparatus illustrated in FIG. 2.

As seen in FIG. 3, the telescopic apparatus 12 for the human-powered vehicle HV comprises a first hydraulic chamber C1, a second hydraulic chamber C2, and a valve member 17. The second hydraulic chamber C2 is configured to be in fluid communication with the first hydraulic chamber C1. The valve member 17 is configured to control a fluid communication between the first hydraulic chamber C1 and the second hydraulic chamber C2. In this embodiment, the telescopic apparatus 12 comprises a hydraulic structure 18. The hydraulic structure 18 includes the first hydraulic chamber C1, the second hydraulic chamber C2, and the valve member 17.

The hydraulic structure 18 includes a passageway PW. The passageway PW is provided between the first hydraulic chamber C1 and the second hydraulic chamber C2. The valve member 17 is configured to change the fluid communication state of the hydraulic structure 18 between a closed state where the valve member 17 closes the passageway PW and an open state where the valve member 17 opens the passageway PW. The first hydraulic chamber C1 and the second hydraulic chamber C2 are filled with a substantially incompressible fluid (e.g., oil).

The hydraulic structure 18 includes a valve structure 21. The valve member 17 is movable relative to the valve structure 21 among a closed position P10, a first open position P11, and a second open position P12 in the telescopic direction D1. The hydraulic structure 18 is in the closed state when the valve member 17 is in the closed position P10. The hydraulic structure 18 is in a first open state when the valve member 17 is in the first open position P11. The hydraulic structure 18 is in a second open state when the valve member 17 is in the second open position P12.

Figure 4:
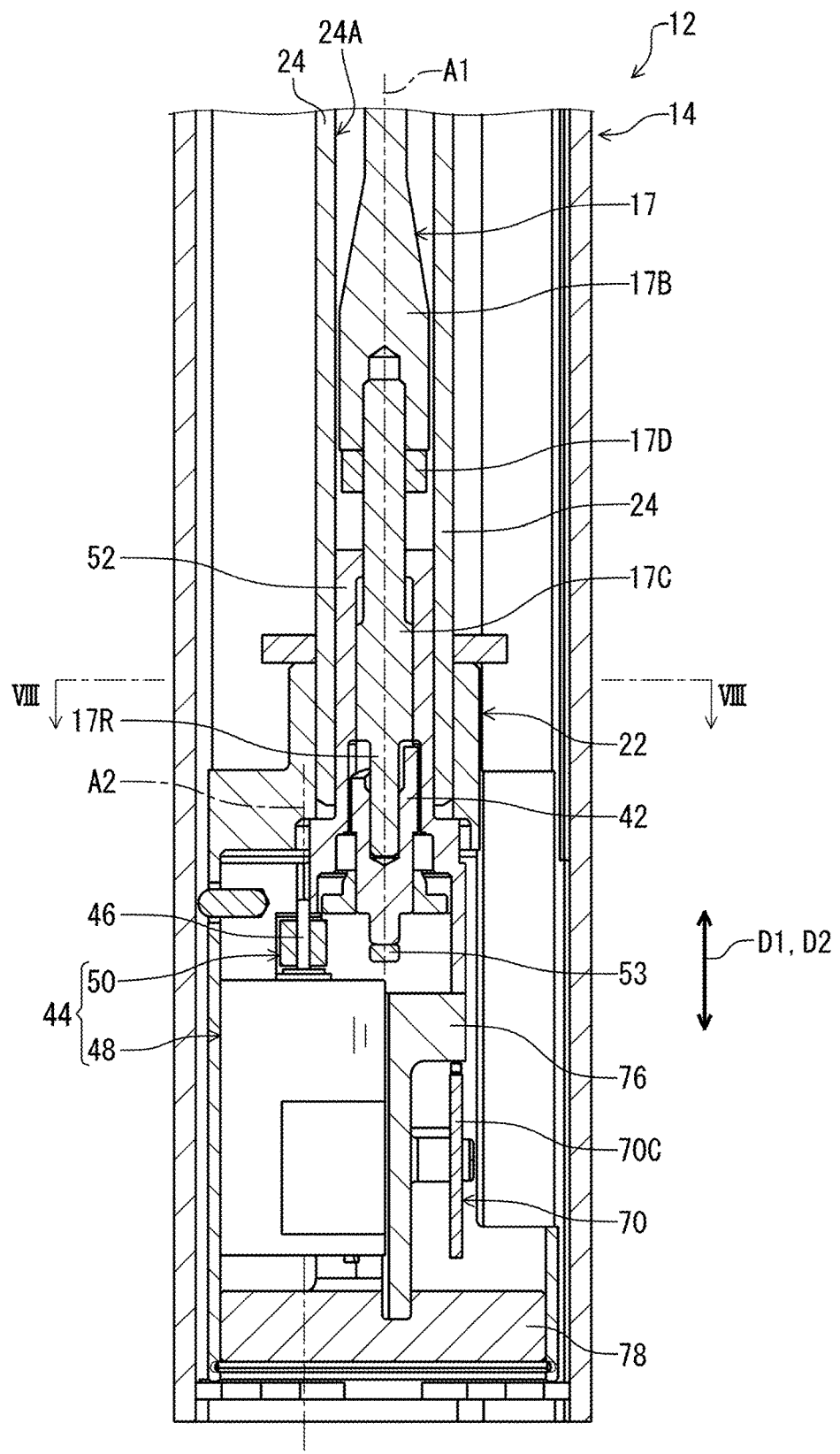
FIG. 4 is a partial cross-sectional view of the telescopic apparatus illustrated in FIG. 2.

As seen in FIG. 4, the hydraulic structure 18 includes a first support 22 and a first inner tube 24. The first support 22 is secured to the first opposite end 14B of the first tube 14. The first inner tube 24 is secured to the first support 22 and provided in the first tube 14. The first inner tube 24 extends from the first support 22 in the telescopic direction D1.

As seen in FIG. 3, the valve structure 21 is secured to an end of the first inner tube 24. The valve structure 21 includes an internal cavity 21A. The first inner tube 24 includes a cavity 24A. The valve member 17 is movably provided in the internal cavity 21A and the cavity 24A. The valve member 17 and the valve structure 21 define a valve chamber C3 in the internal cavity 21A.

Figure 5:
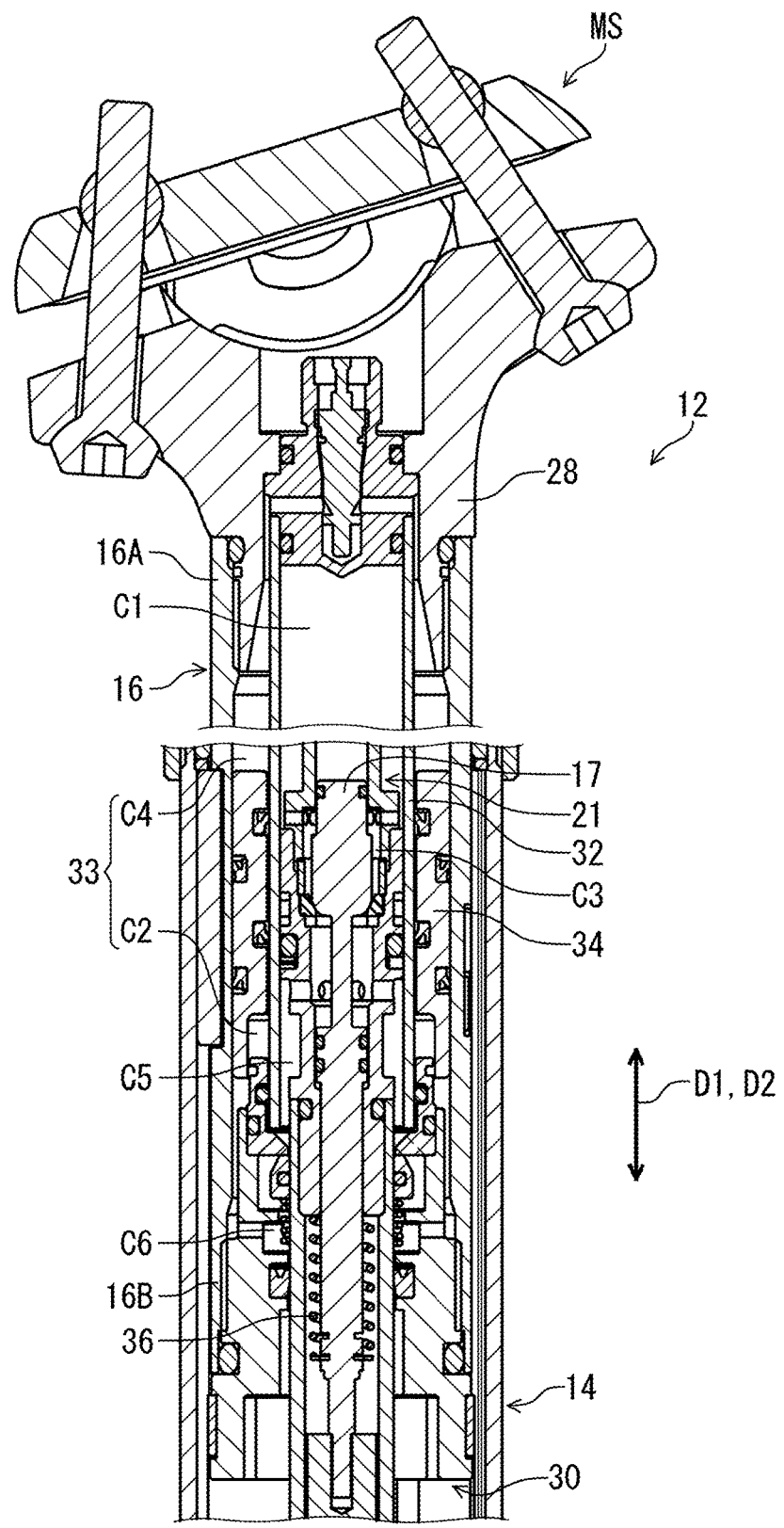
FIG. 5 is a partial cross-sectional view of the telescopic apparatus illustrated in FIG. 2.

As seen in FIG. 5, the hydraulic structure 18 includes a second support 28, an intermediate support 30, and a second inner tube 32. The second support 28 is secured to the second end 16A of the second tube 16. The second support 28 is integrally provided with the saddle mounting structure MS and couples the saddle mounting structure MS to the second tube 16. The intermediate support 30 is secured to the second opposite end 16B of the second tube 16. The second inner tube 32 is provided in the second tube 16 and disposed between the second support 28 and the intermediate support 30. The second support 28 and the intermediate support 30 are secured to the second tube 16 to hold the second inner tube 32 in the second tube 16. The second tube 16, the second inner tube 32, the second support 28, and the intermediate support 30 define an internal space 33.

The hydraulic structure 18 includes a floating piston 34. The floating piston 34 is movably provided in the internal space 33 to divide the internal space 33 into the second hydraulic chamber C2 and a biasing chamber C4. The biasing chamber C4 is filled with a compressible fluid (e.g., gas such as air) to produce biasing force to lengthen the telescopic apparatus 12. The compressible fluid is compressed in the biasing chamber C4 to produce the biasing force in a state where the total length L1 of the telescopic apparatus 12 is the maximum total length L11 (FIG. 2).

As seen in FIG. 3, the intermediate support 30 includes a support opening 30A. The first inner tube 24 extend through the support opening 30A. The valve structure 21 is movably provided in a cavity 32A of the second inner tube 32. The valve structure 21 is in slidable contact with an inner peripheral surface 32B of the second inner tube 32. As seen in FIG. 5, the valve structure 21, the second inner tube 32, and the second support 28 define the first hydraulic chamber C1 in the second inner tube 32.

As seen in FIG. 3, the first inner tube 24, the valve structure 21, the second inner tube 32, and the intermediate support 30 define a first intermediate chamber C5 and a second intermediate chamber C6. The valve structure 21 includes a plurality of first holes H1 and a plurality of second holes H2. The plurality of first holes H1 connects the first hydraulic chamber C1 to the valve chamber C3. The plurality of second holes H2 connects the valve chamber C3 to the first intermediate chamber C5. The intermediate support 30 includes a plurality of third holes H3 and a plurality of fourth holes H4. The plurality of third holes H3 connects the first intermediate chamber C5 to the second intermediate chamber C6. The plurality of fourth holes H4 connects the second intermediate chamber C6 to the second hydraulic chamber C2. The passageway PW includes the plurality of first holes H1, the valve chamber C3, the plurality of second holes H2, the first intermediate chamber C5, the plurality of third holes H3, the second intermediate chamber C6, and the plurality of fourth holes H4.

The valve structure 21 includes a valve base 21B and a valve seat 21C. The valve base 21B includes the plurality of first holes H1 and the plurality of second holes H2. The valve seat 21C is attached to the valve base 21B to be contactable with the valve member 17. The valve member 17 is in contact with the valve seat 21C to close the passageway PW in the closed state where the valve member 17 is in the closed position P10. The valve member 17 is spaced apart from the valve seat 21C to open the passageway PW in the open state where the valve member 17 is in each of the first open position P11 and the second open position P12.

The telescopic apparatus 12 comprises a biasing member 36 to bias the valve member 17 toward the closed position P10. The biasing member 36 is provided in the first inner tube 24. For example, the biasing member 36 includes a spring. The valve member 17 includes a plurality of seal rings SR1. The hydraulic structure 18 includes a plurality of seal rings SR2.

The substantially incompressible fluid does not flow between the first hydraulic chamber C1 and the second hydraulic chamber C2 in the closed state where the valve member 17 closes the passageway PW. Thus, in the closed state, the first tube 14 and the second tube 16 are fixedly positioned relative to each other in the telescopic direction D1.

The substantially incompressible fluid can flow between the first hydraulic chamber C1 and the second hydraulic chamber C2 through the passageway PW in the open state where the valve member 17 opens the passageway PW. For example, when the rider's weight is applied to the second tube 16 in the open state, the substantially incompressible fluid flows from the first hydraulic chamber C1 to the second hydraulic chamber C2 through the passageway PW. Thus, the floating piston 34 is pressed toward the biasing chamber C4 relative to the first tube 14, increasing a volume of the second hydraulic chamber C2 while the compressible fluid is compressed in the biasing chamber C4. This downwardly moves the second tube 16 relative to the first tube 14 against the basing force of the biasing chamber C4 while the rider's weight is applied to the second tube 16, allowing the rider to lower the saddle using the rider's weight in the open state.

The compressible fluid compressed in the biasing chamber C4 biases the second tube 16 to upwardly move relative to the first tube 14 in the telescopic direction D1 and to downwardly move the floating piston 34 in the telescopic direction D1. When the rider's weight is released from the second tube 16 in the open state, the substantially incompressible fluid flows from the second hydraulic chamber C2 to the first hydraulic chamber C1 through the passageway PW because of the biasing force of the biasing chamber C4. This upwardly moves the second tube 16 relative to the first tube 14 while the rider's weight is released from the second tube 16, allowing the rider to lift the saddle by releasing the rider's weight in the open state.

Figure 6:
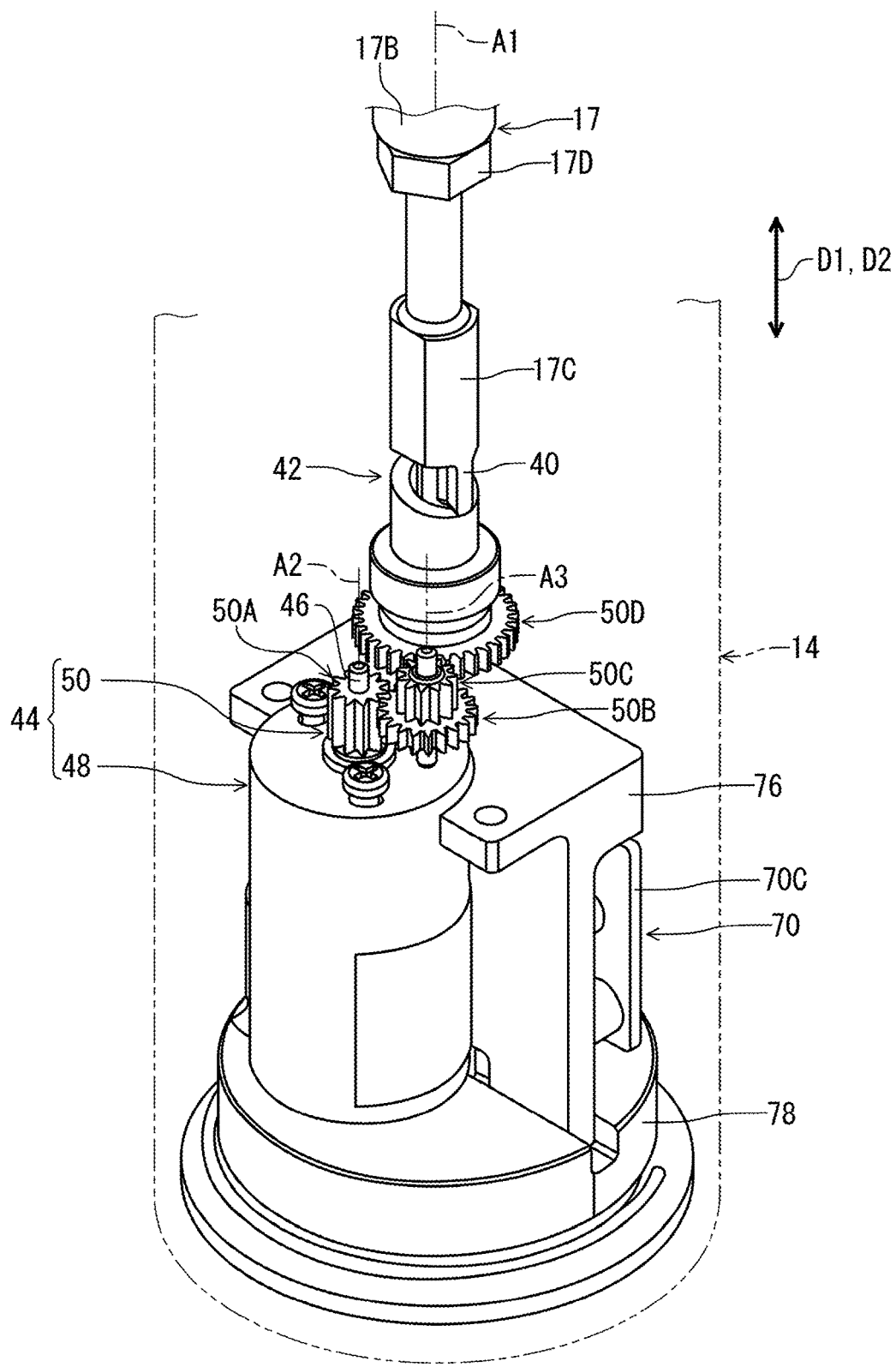
FIG. 6 is a partial perspective view of an internal structure of the telescopic apparatus illustrated in FIG. 2.

As seen in FIG. 6, the telescopic apparatus 12 for the human-powered vehicle HV comprises a cam follower 40. The cam follower 40 is coupled to the valve member 17 so as to move the valve member 17. In this embodiment, the cam follower 40 is integrally provided with the valve member 17 as a one-piece unitary member. The cam follower 40 can be a separate member from the valve member 17.

The telescopic apparatus 12 for the human-powered vehicle HV comprises a cam member 42. The cam member 42 is rotatable about a rotational axis A1 to guide the cam follower 40 in a movement direction D2. Thus, the cam member 42 is rotatable about the rotational axis A1 to move the valve member 17 in the movement direction D2.

The telescopic apparatus 12 for the human-powered vehicle HV comprises an actuator 44. The actuator 44 is configured to rotate the cam member 42. The actuator 44 includes an output shaft 46 rotatable about an actuation rotational axis A2. The cam follower 40, the cam member 42, and the actuator 44 are provided in the first tube 14.

In this embodiment, the actuator 44 includes a motor 48 and a gear reducer 50. The motor 48 is configured to rotate the output shaft 46 about the actuation rotational axis A2. The output shaft 46 is coupled to a rotor of the motor 48. The gear reducer 50 is configured to reduce a rotational speed of the cam member 42 compared with a rotational speed of the output shaft 46. Examples of the motor 48 include a direct-current motor and a stepper motor.

The gear reducer 50 includes an output gear 50A, a first intermediate gear 50B, a second intermediate gear 50C, and a receiving gear 50D. The output gear 50A is attached to the output shaft 46 to be rotatable along with the output shaft 46 about the actuation rotational axis A2. The first intermediate gear 50B and the second intermediate gear 50C are rotatable about an intermediate rotational axis A3. The receiving gear 50D is attached to the cam member 42 to be rotatable along with the cam member 42 about the rotational axis A1. The output gear 50A is configured to mesh with the first intermediate gear 50B. The receiving gear 50D is configured to mesh with the second intermediate gear 50C. The structure of the gear reducer 50 is not limited to this embodiment.

At least one of the rotational axis A1 and the actuation rotational axis A2 extends along the movement direction D2. At least one of the rotational axis A1, the actuation rotational axis A2, and the intermediate rotational axis A3 extends along the movement direction D2. In this embodiment, the rotational axis A1, the actuation rotational axis A2, and the intermediate rotational axis A3 extends along the movement direction D2. The rotational axis A1, the actuation rotational axis A2, and the intermediate rotational axis A3 are parallel to the movement direction D2. The movement direction D2 is parallel to the telescopic direction D1. However, at least one of the rotational axis A1, the actuation rotational axis A2, and the intermediate rotational axis A3 can be inclined relative to the movement direction D2. The movement direction D2 can be inclined relative to the telescopic direction D1.

As seen in FIG. 4, the actuator 44 includes a base member 52. The base member 52 is configured to accommodate at least a part of the cam member 42 and at least a part of the valve member 17. The base member 52 is configured to guide the valve member 17 in the movement direction D2. The base member 52 is attached to the first support 22 with fasteners such as screws. The base member 52 is at least partly provided in the first inner tube 24. The motor 48 is secured to the base member 52. The valve member 17 and the cam follower 40 are movable relative to the base member 52 in the movement direction D2. The cam member 42 is rotatable relative to the base member 52 about the rotational axis A1. The output shaft 46 is rotatable relative to the base member 52 about the actuation rotational axis A2. The actuator 44 includes a support rod 53. The support rod 53 is attached to the base member 52 to rotatably support the cam member 42.

As seen in FIGS. 3 and 4, the valve member 17 includes a valve body 17A, a coupling rod 17B, a guided body 17C, and a fastener 17D. The coupling rod 17B couples the valve body 17A to the guided body 17C. The guided body 17C is secured to the coupling rod 17B with the fastener 17D. The guided body 17C is at least partly provided in the base member 52. The base member 52 is configured to guide the guided body 17C of the valve member 17 in the movement direction D2. The guided body 17C can be secured to the coupling rod 17B without the fastener 17D. The guided body 17C can be integrally provided with the coupling rod 17B as a one-piece unitary member. The valve body 17A can be integrally provided with the coupling rod 17B as a one-piece unitary member.

Figure 7:
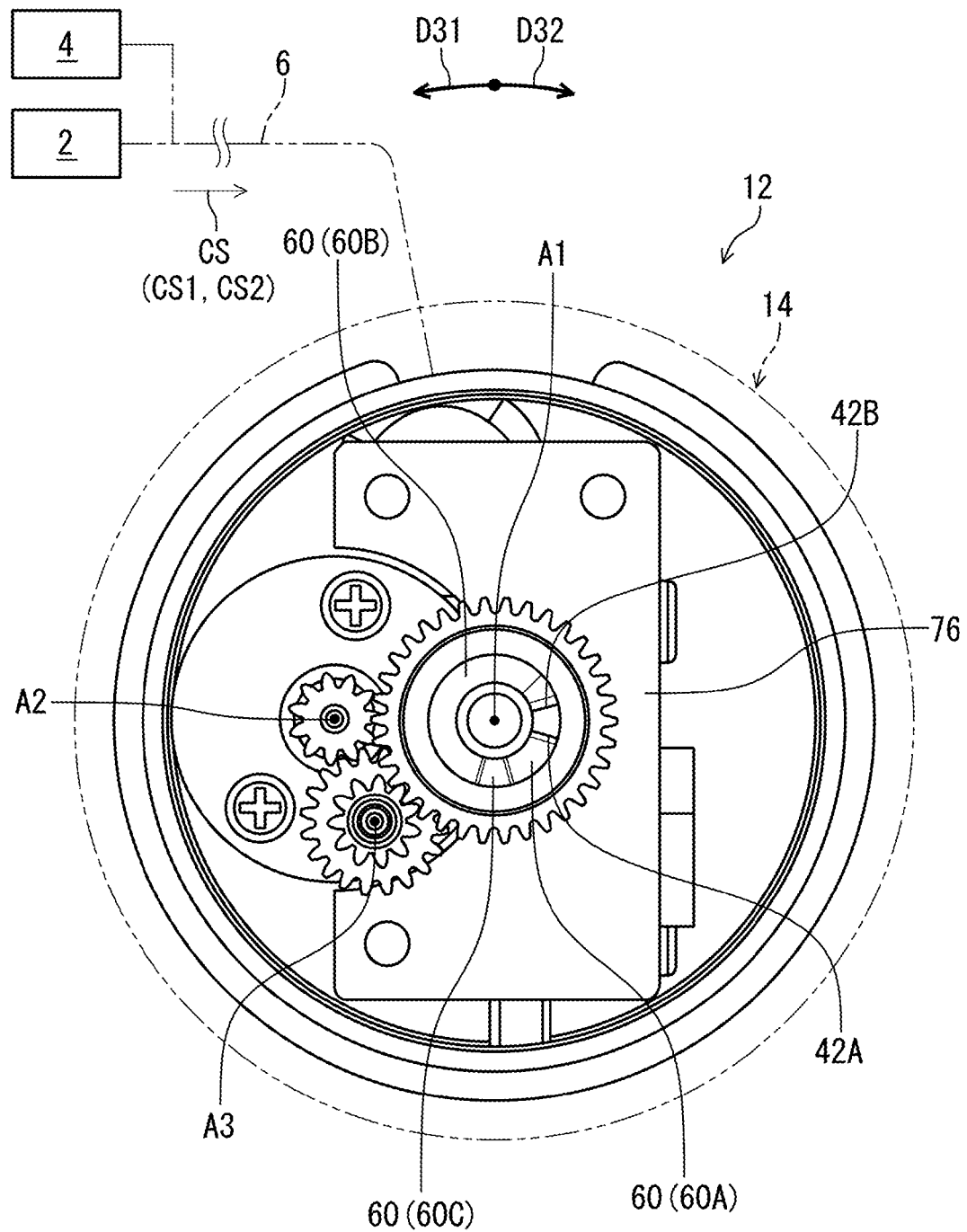
FIG. 7 is a plan view of the internal structure of the telescopic apparatus illustrated in FIG. 2.

As seen in FIG. 7, the actuation rotational axis A2 is offset from the rotational axis A1 as viewed in the movement direction D2. The intermediate rotational axis A3 is offset from the actuation rotational axis A2 and the rotational axis A1 as viewed in the movement direction D2. However, the positional relationship between the actuation rotational axis A2, the rotational axis A1, and the intermediate rotational axis A3 is not limited to this embodiment.

Figure 8:
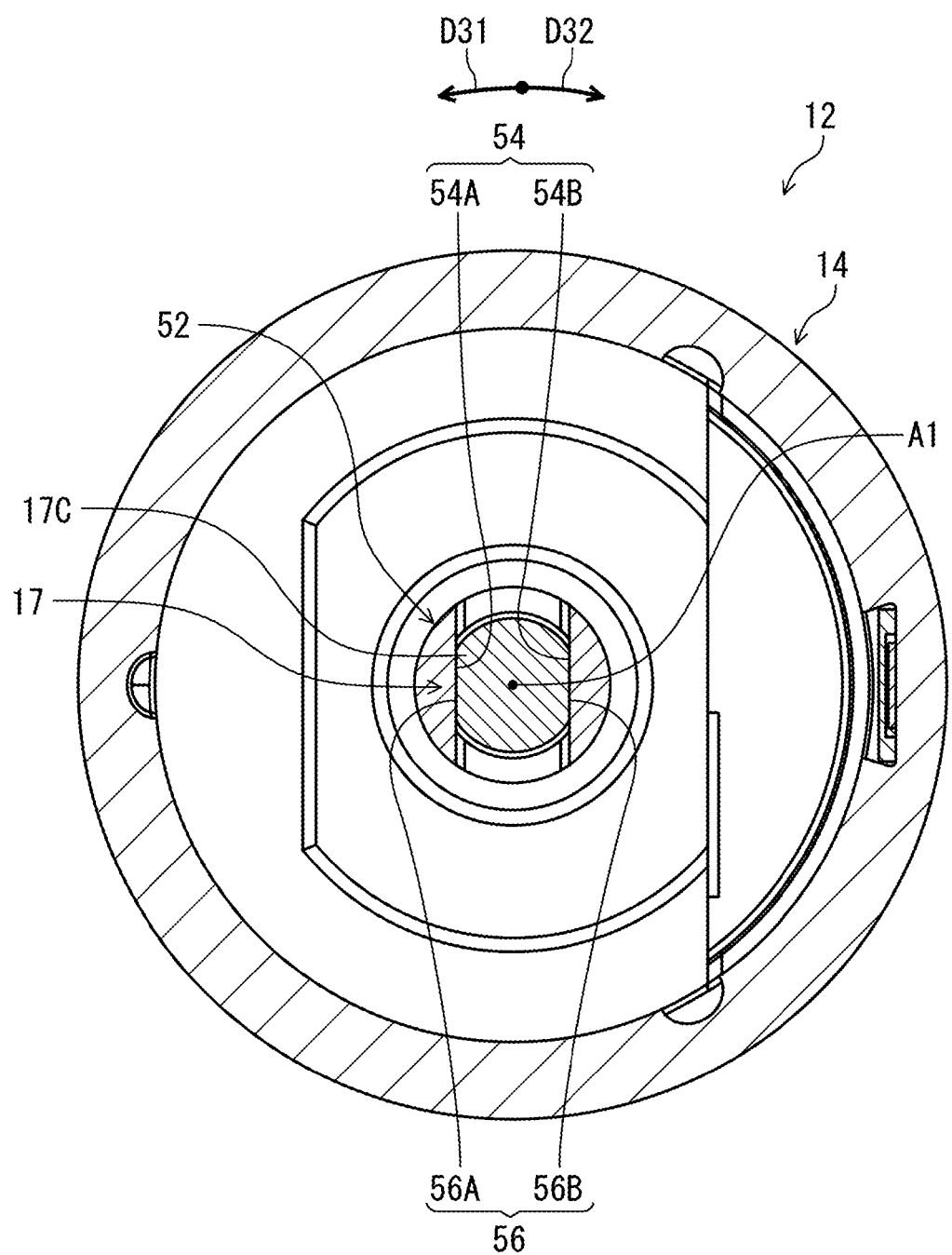
FIG. 8 is a cross-sectional view of the telescopic apparatus taken along line VIII-VIII of FIG. 1

As seen in FIG. 8, the base member 52 includes a base member surface 54. The base member surface 54 is configured to be at least partially in contact with the valve member 17. The valve member 17 includes a valve member surface 56. The valve member surface 56 is configured to be at least partially in contact with the base member surface 54 such that a rotation of the valve member 17 relative to the base member 52 is restricted.

In this embodiment, the base member surface 54 includes a first base member surface 54A and a second base member surface 54B. The first base member surface 54A is spaced apart from the second base member surface 54B. The first base member surface 54A is configured to face toward the second base member surface 54B. The rotational axis A1 is provided between the first base member surface 54A and the second base member surface 54B as viewed along the rotational axis A1.

The valve member surface 56 includes a first valve member surface 56A and a second valve member surface 56B. The first valve member surface 56A is provided on a reverse side of the second valve member surface 56B. The first base member surface 54A is configured to be in contact with the first valve member surface 56A. The second base member surface 54B is configured to be in contact with the second valve member surface 56B. Each of the first base member surface 54A, the second base member surface 54B, the first valve member surface 56A, and the second valve member surface 56B includes a flat surface. Thus, the base member 52 is configured to restrict the rotation of the valve member 17 relative to the base member 52 about the rotational axis A1 while allowing the valve member 17 to move relative to the base member 52 in the movement direction D2.

Figure 9:
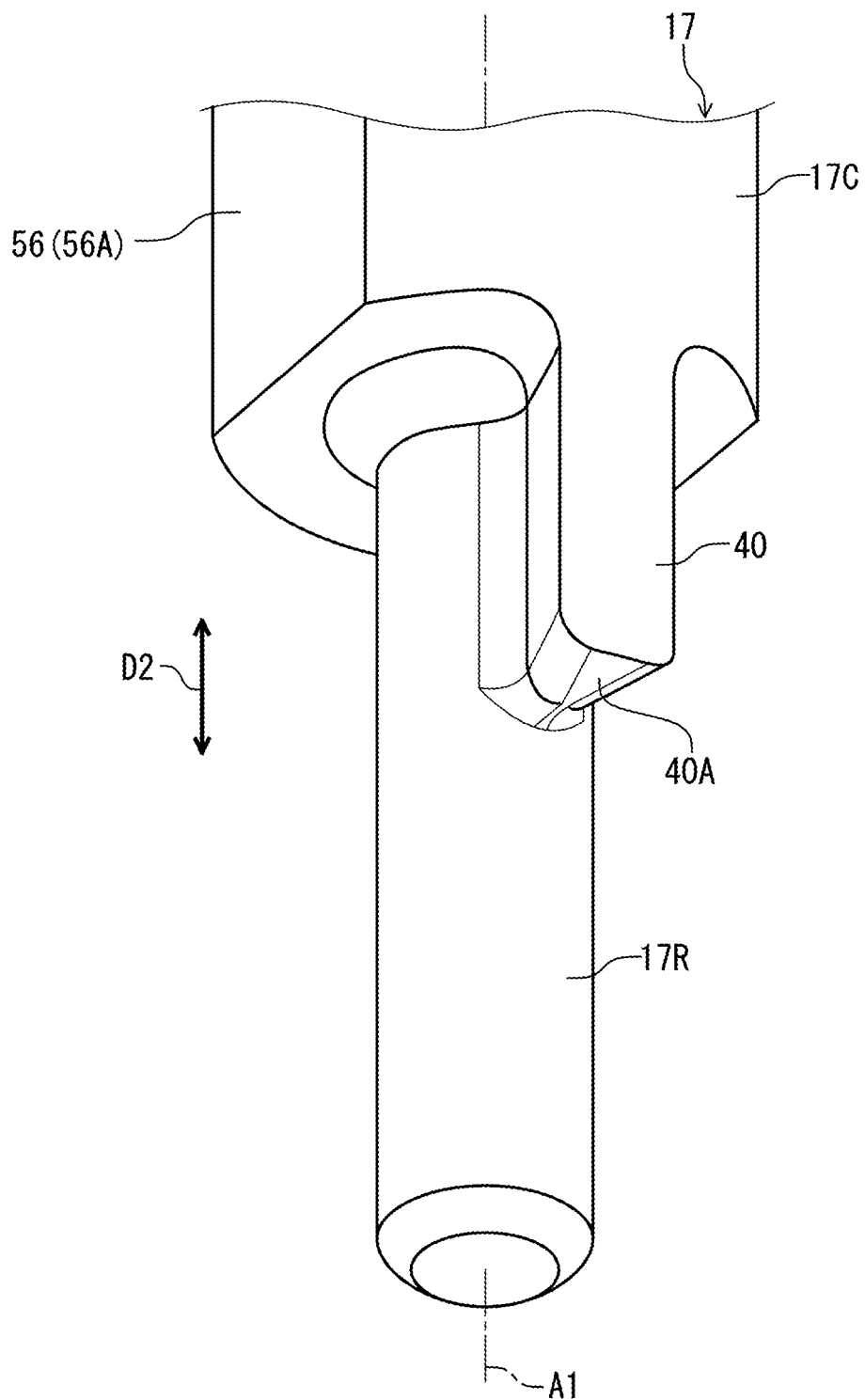
FIG. 9 is a perspective view of a valve member of the telescopic apparatus illustrated in FIG. 2.

As seen in FIG. 9, the valve member 17 includes a rod body 17R extending along the movement direction D2. The cam follower 40 protrudes radially outwardly from the rod body 17R. The rod body 17R extends from the guided body 17C along the rotational axis A1. The cam follower 40 extends from the guided body 17C along the rod body 17R in the movement direction D2. The cam follower 40 includes a slidable surface 40S facing in the movement direction D2. The slidable surface 40S is provided radially outwardly of the rod body 17R.

Figure 10:
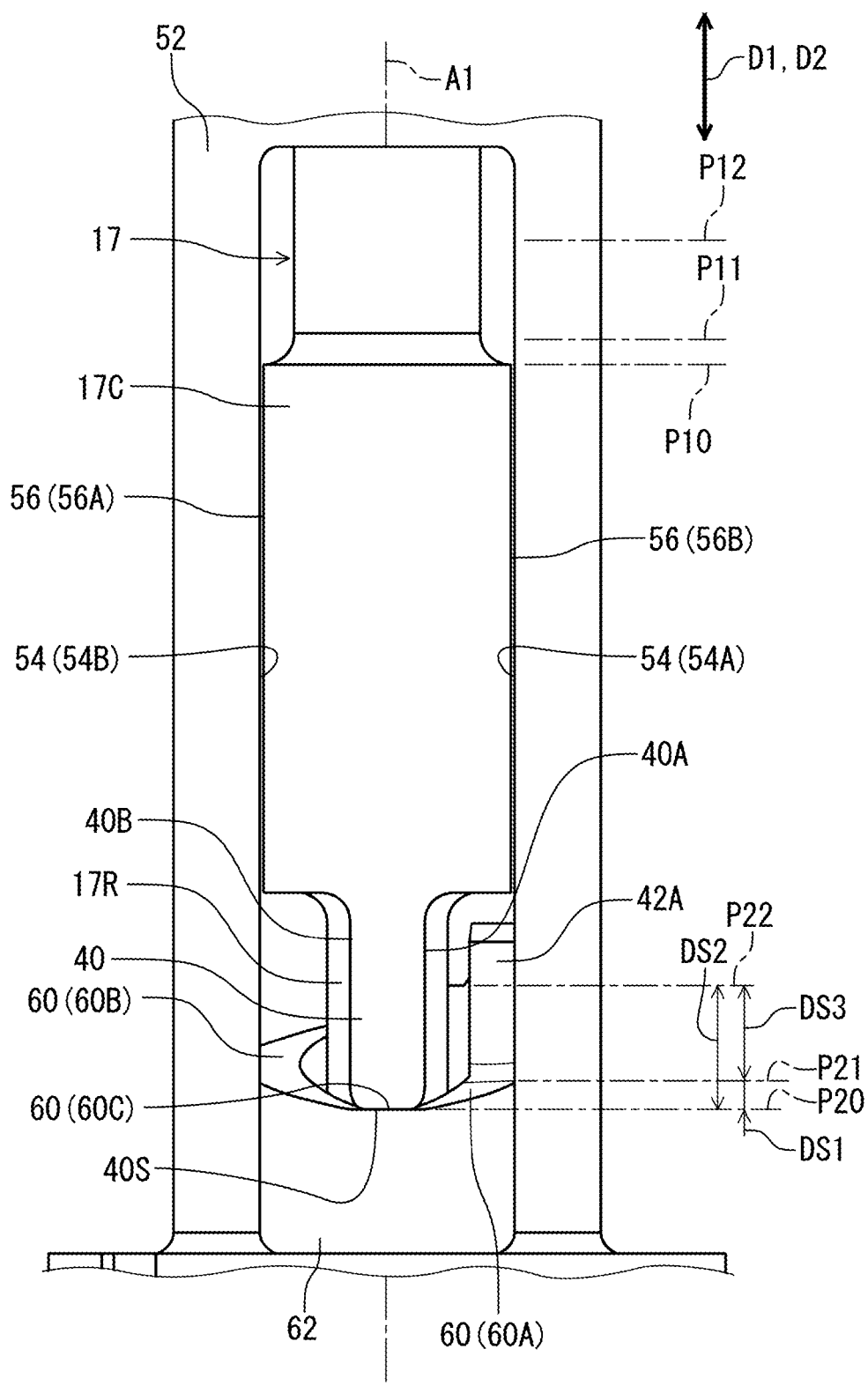
FIG. 10 is a side elevational view of the valve member, a cam follower, a cam member, and a base member of the telescopic apparatus illustrated in FIG. 2 (third position).
Figure 11:
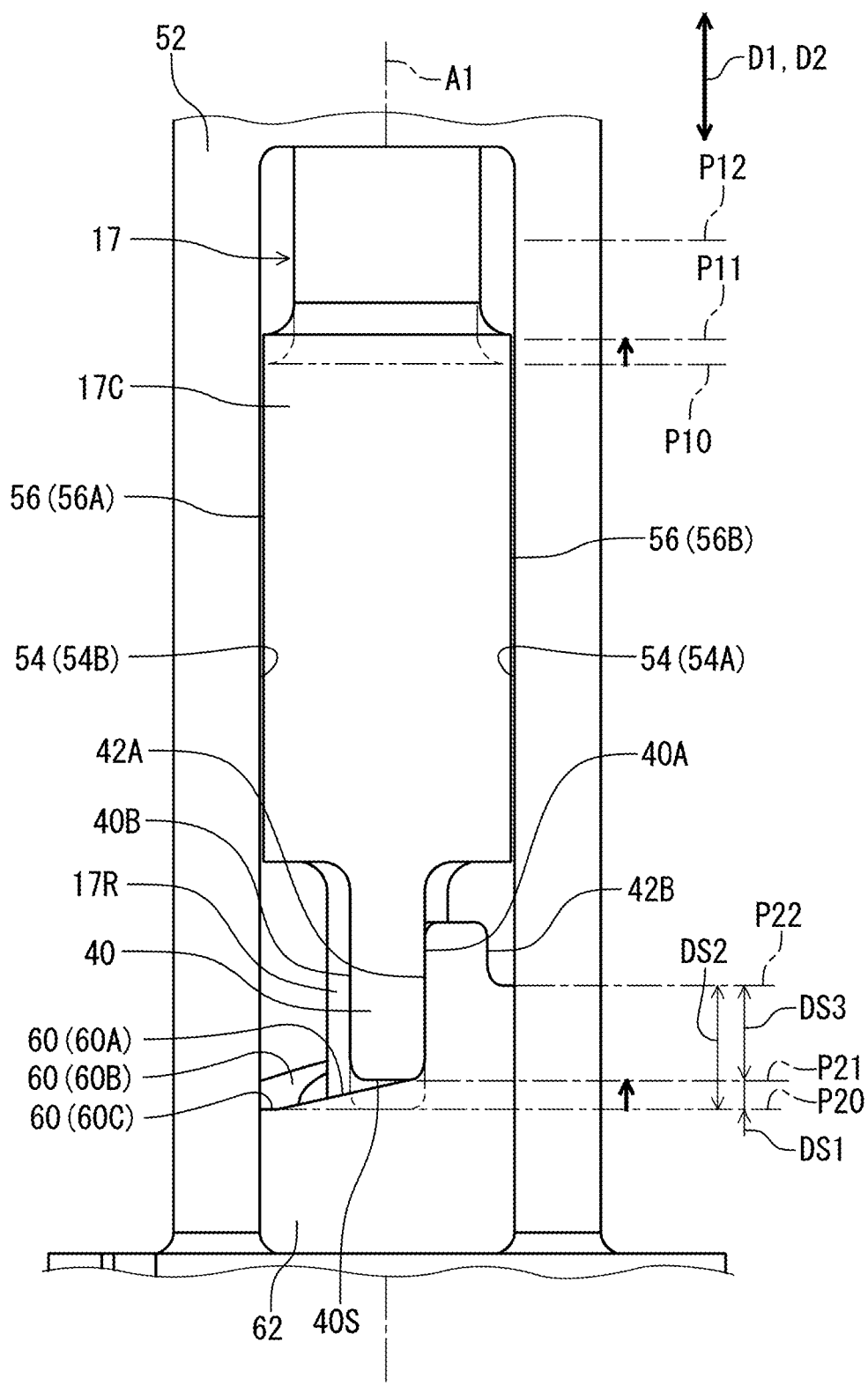
FIG. 11 is a side elevational view of the valve member, the cam follower, the cam member, and the base member of the telescopic apparatus illustrated in FIG. 2 (first position).
Figure 12:
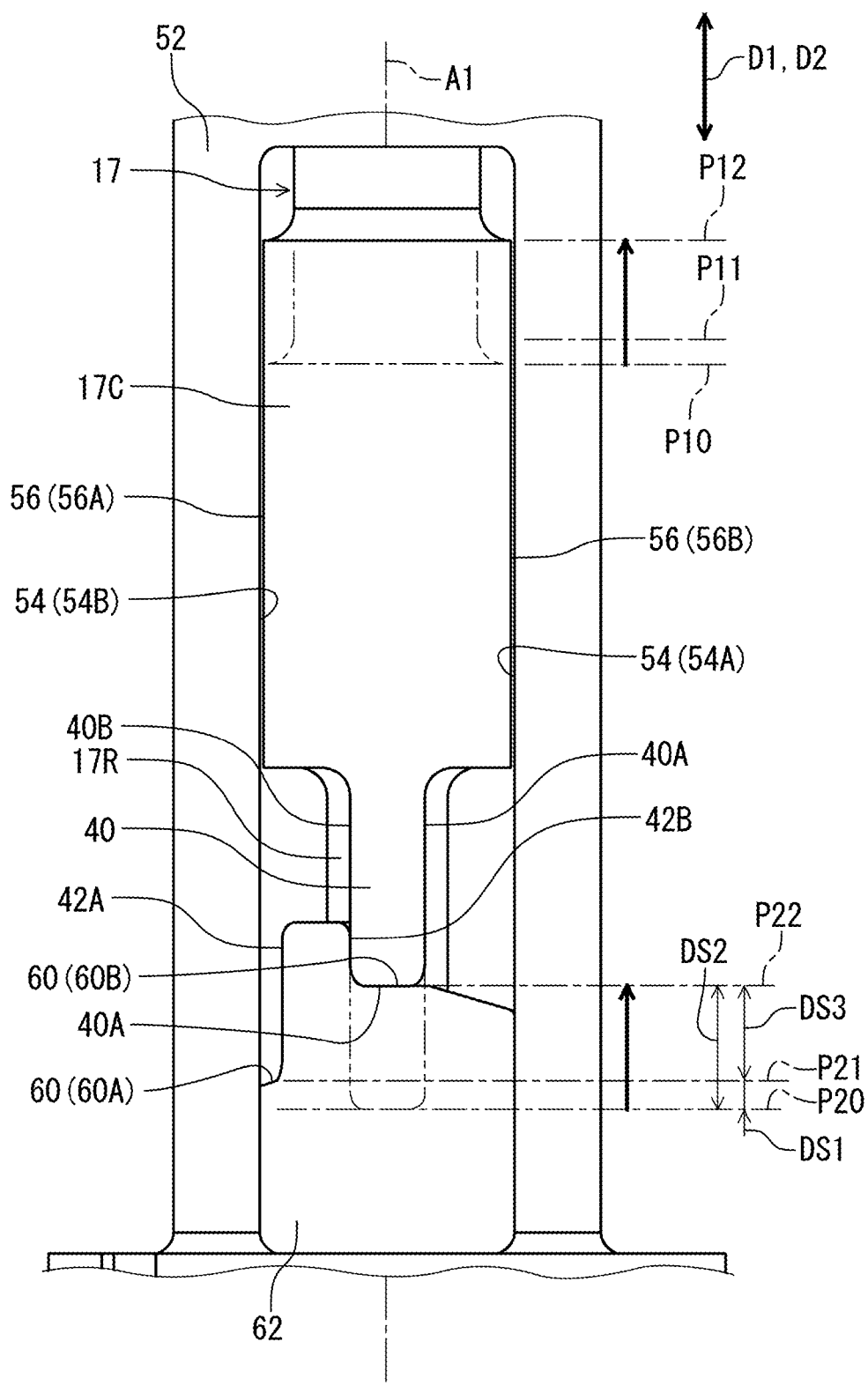
FIG. 12 is a side elevational view of the valve member, the cam follower, the cam member, and the base member of the telescopic apparatus illustrated in FIG. 2 (second position).

As seen in FIGS. 10 to 12, the cam member 42 includes a plurality of cam surfaces 60 configured to arrange the cam follower 40 in one of a first position P21, a second position P22, and a third position P20. The first position P21 corresponds to the first open position P11. The second position P22 corresponds to the second open position P12. The third position P20 corresponds to the closed position P10.

As seen in FIG. 10, the third cam surface 60C is configured to contact with the cam follower 40 so as to arrange the cam follower 40 in the third position P20. A first distance DS1 defined between the first position P21 and the third position P20 in the movement direction is shorter than a second distance DS2 defined between the second position P22 to the third position P20 in the movement direction D2. A difference between the second distance DS2 and the first distance DS1 is longer than the first distance DS1. However, the first distance DS1 can be longer than the second distance DS2. The difference between the second distance DS2 and the first distance DS1 can be equal to or shorter than the first distance DS1.

Figure 13:
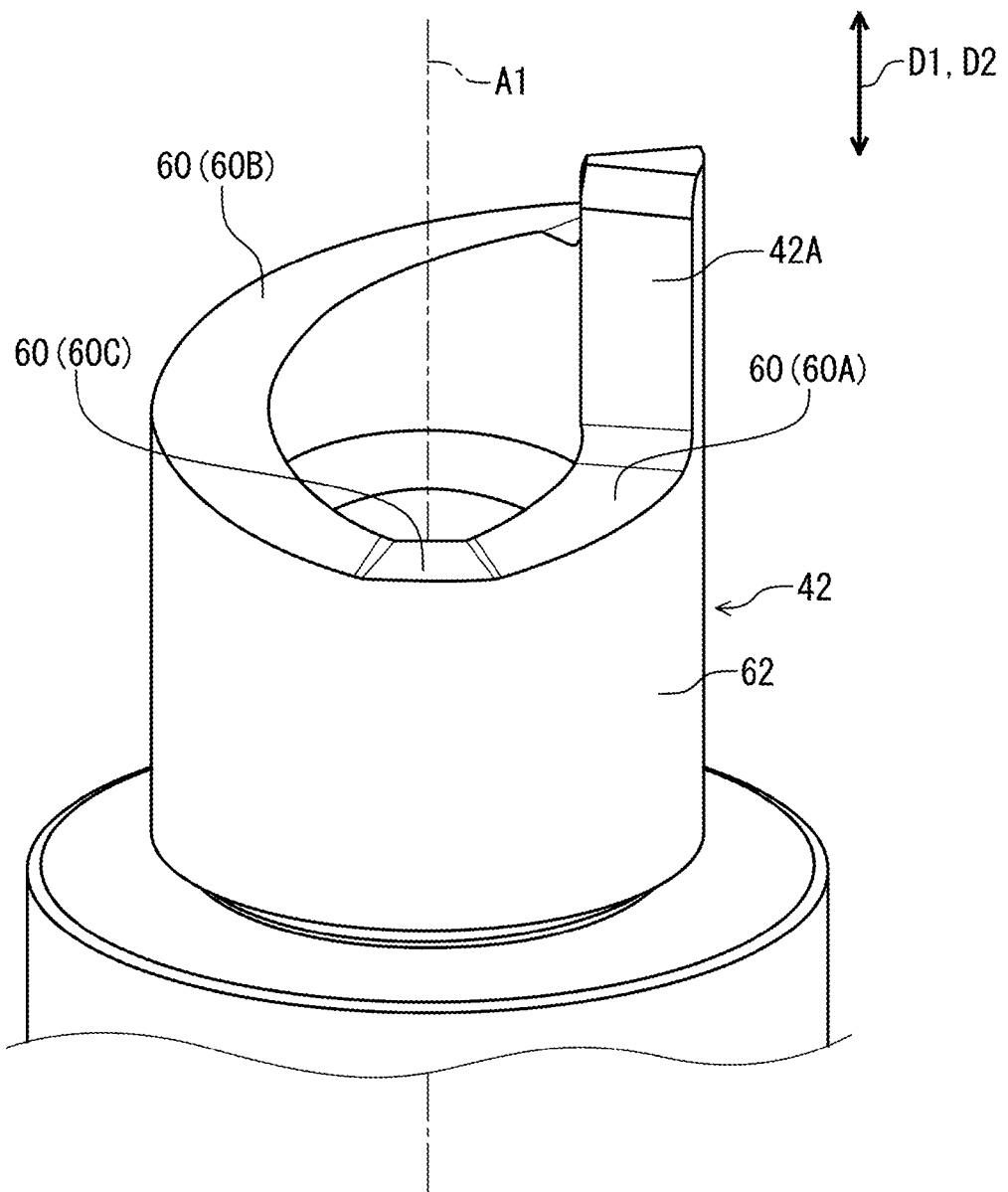
FIG. 13 is a perspective view of the cam member of the telescopic apparatus illustrated in FIG. 2.

As seen in FIG. 13, the cam member 42 includes a tubular body 62 rotatable relatively about the rotational axis A1. The first cam surface 60A, the second cam surface 60B, and the third cam surface 60C are provided on an axial end of the tubular body 62. The tubular body 62 extends along the rotational axis A1.

The plurality of cam surfaces 60 includes a first cam surface 60A. The plurality of cam surfaces 60 includes a second cam surface 60B. The plurality of cam surfaces 60 includes a third cam surface 60C.

The second cam surface 60B is different from the first cam surface 60A. The second cam surface 60B is provided at a circumferential position which is different from a circumferential position of the first cam surface 60A. The second cam surface 60B has a shape different from a shape of the first cam surface 60A.

The third cam surface 60C is different from the first cam surface 60A and the second cam surface 60B. The third cam surface 60C is provided at a circumferential position which is different from the circumferential positions of the first cam surface 60A and the second cam surface 60B. The third cam surface 60C has a shape different from the shapes of the first cam surface 60A and the second cam surface 60B.

As seen in FIG. 11, the first cam surface 60A is configured to be in contact with the cam follower 40 so as to arrange the cam follower 40 in the first position P21. The cam member 42 includes a first stopper 42A extending from the axial end of the tubular body 62. The first stopper 42A is configured to be in contact with the cam follower 40 to stop the cam follower 40 in the first position P21.

The first stopper 42A extends from the first cam surface 60A in the movement direction D2. The cam follower 40 includes a first circumferential surface 40A extending from the slidable surface 40S in the movement direction D2. The first stopper 42A is configured to be in contact with the first circumferential surface 40A to stop the cam follower 40 in the first position P21.

The first cam surface 60A is at least partly inclined relative to the rotational axis A1. In this embodiment, the first cam surface 60A is entirely inclined relative to the rotational axis A1 to extend from the third cam surface 60C to the first stopper 42A.

As seen in FIG. 12, the second cam surface 60B is configured to contact with the cam follower 40 so as to arrange the cam follower 40 in the second position P22. The cam member 42 includes a second stopper 42B extending from the axial end of the tubular body 62. The second stopper 42B is configured to be in contact with the cam follower 40 to stop the cam follower 40 in the second position P22.

The second stopper 42B extends from the second cam surface 60B in the movement direction D2. The cam follower 40 includes a second circumferential surface 40B extending from the slidable surface 40S in the movement direction D2. The second stopper 42B is configured to be in contact with the second circumferential surface 40B to stop the cam follower 40 in the second position P22.

As seen in FIGS. 11 and 12, the second cam surface 60B is at least partly inclined relative to the rotational axis A1. In this embodiment, the second cam surface 60B is partly inclined relative to the rotational axis A1 to extend from the third cam surface 60C to the second stopper 42B.

Figure 14:
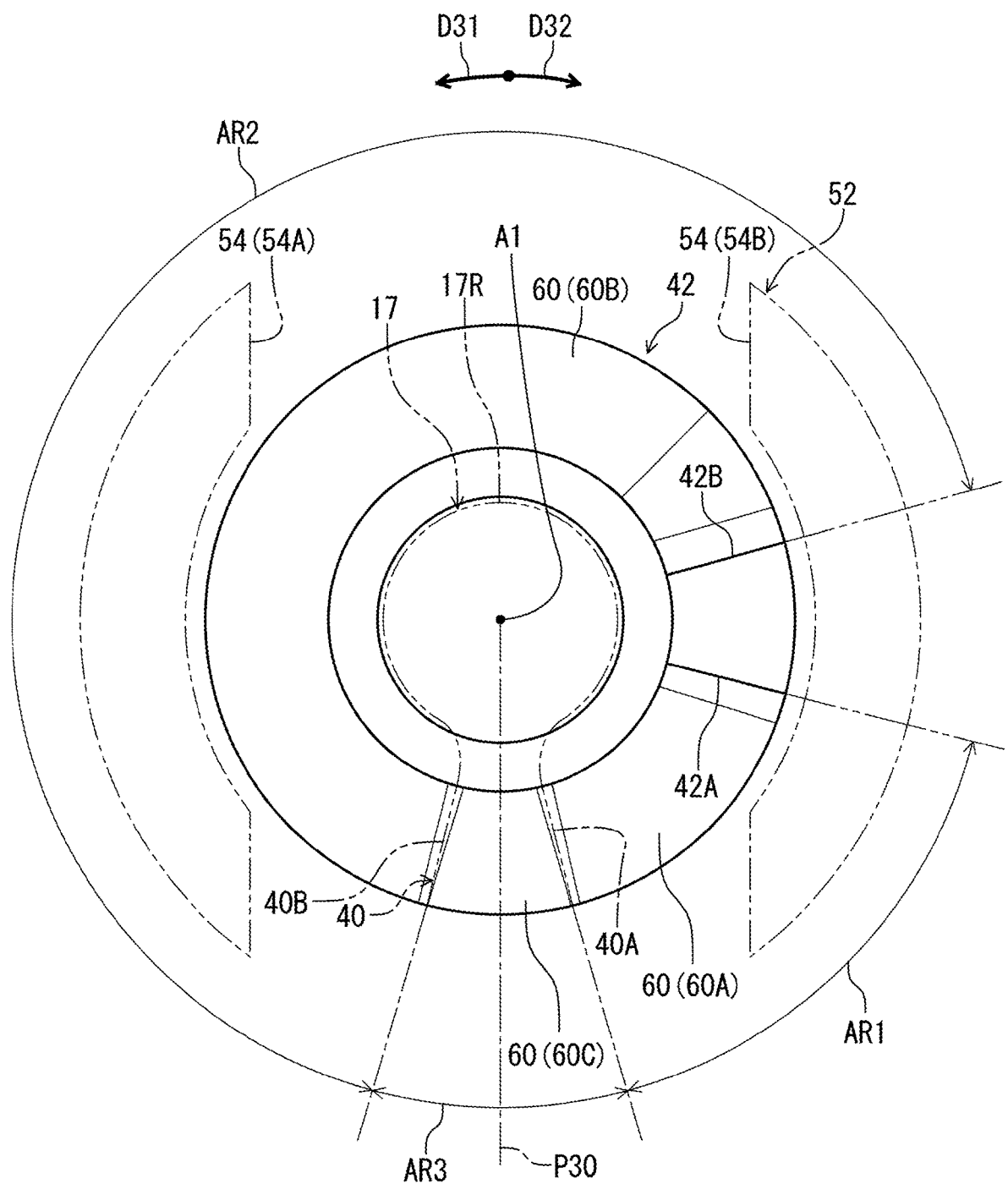
FIG. 14 is a plan view of the cam member of the telescopic apparatus illustrated in FIG. 2 (initial position).

As seen in FIG. 14, the plurality of cam surfaces 60 circumferentially extends about the rotational axis A1 as viewed in the movement direction D2. The first cam surface 60A circumferentially extends from the third cam surface 60C in a first circumferential direction D31 as viewed in the movement direction D2. The second cam surface 60B circumferentially extends from the third cam surface 60C in a second circumferential direction D32 as viewed in the movement direction D2. The second circumferential direction D32 is an opposite direction of the first circumferential direction D31.

In this embodiment, the first cam surface 60A circumferentially extends from the third cam surface 60C to the first stopper 42A in the first circumferential direction D31 as viewed in the movement direction D2. The second cam surface 60B circumferentially extends from the third cam surface 60C to the second stopper 42B in the second circumferential direction D32 as viewed in the movement direction D2. The first cam surface 60A has a first angular range AR1 defined about the rotational axis A1. The second cam surface 60B has a second angular range AR2 defined about the rotational axis A1. The third cam surface 60C has a third angular range AR3 defined about the rotational axis A1. The first angular range AR1 is larger than the third angular range AR3. The second angular range AR2 is larger than the first angular range AR1 and the third angular range AR3. However, the positional relationship among the first cam surface 60A, the second cam surface 60B, the third cam surface 60C, the first stopper 42A, and the second stopper 42B is not limited to the illustrated relationship. The first angular range AR1, the second angular range AR2, and the third angular range AR3 are not limited to the illustrated ranges.

Figure 15:
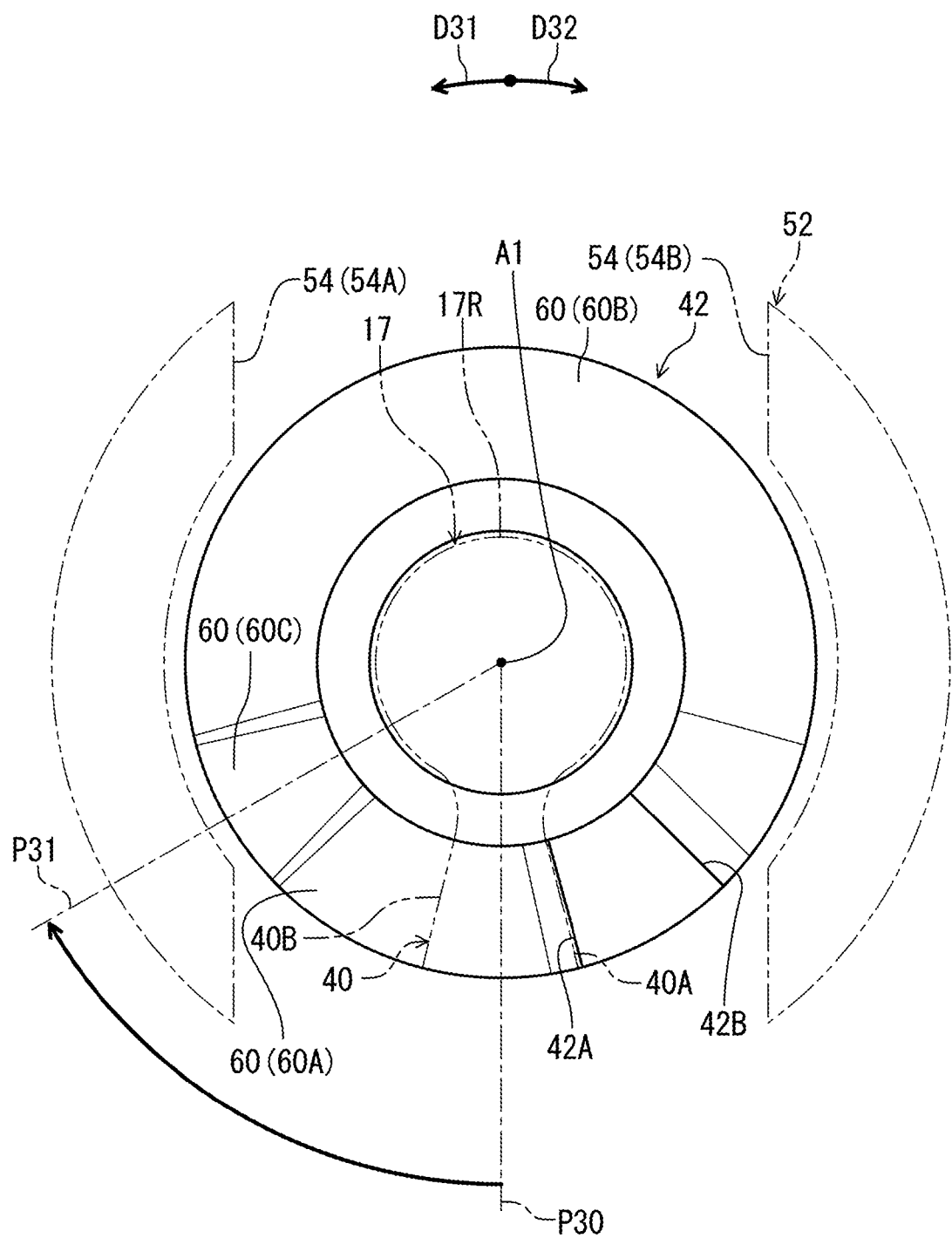
FIG. 15 is a plan view of the cam member of the telescopic apparatus illustrated in FIG. 2 (first actuated position).

As seen in FIG. 15, the cam member 42 is rotatable relatively about the rotational axis A1 from an initial position P30 to a first actuated position P31 to move the cam follower 40 from the third position P20 (see e.g., FIG. 11) to the first position P21 (see e.g., FIG. 11). The cam member 42 is rotatable relative to the base member 52 about the rotational axis A1 from the initial position P30 to the first actuated position P31 to move the cam follower 40 from the third position P20 (see e.g., FIG. 11) to the first position P21 (see e.g., FIG. 11). The cam member 42 is rotatable relative to the base member 52 about the rotational axis A1 from the first actuated position P31 to the initial position P30 to move the cam follower 40 from the first position P21 (see e.g., FIG. 11) to the third position P20 (see e.g., FIG. 11).

Figure 16:
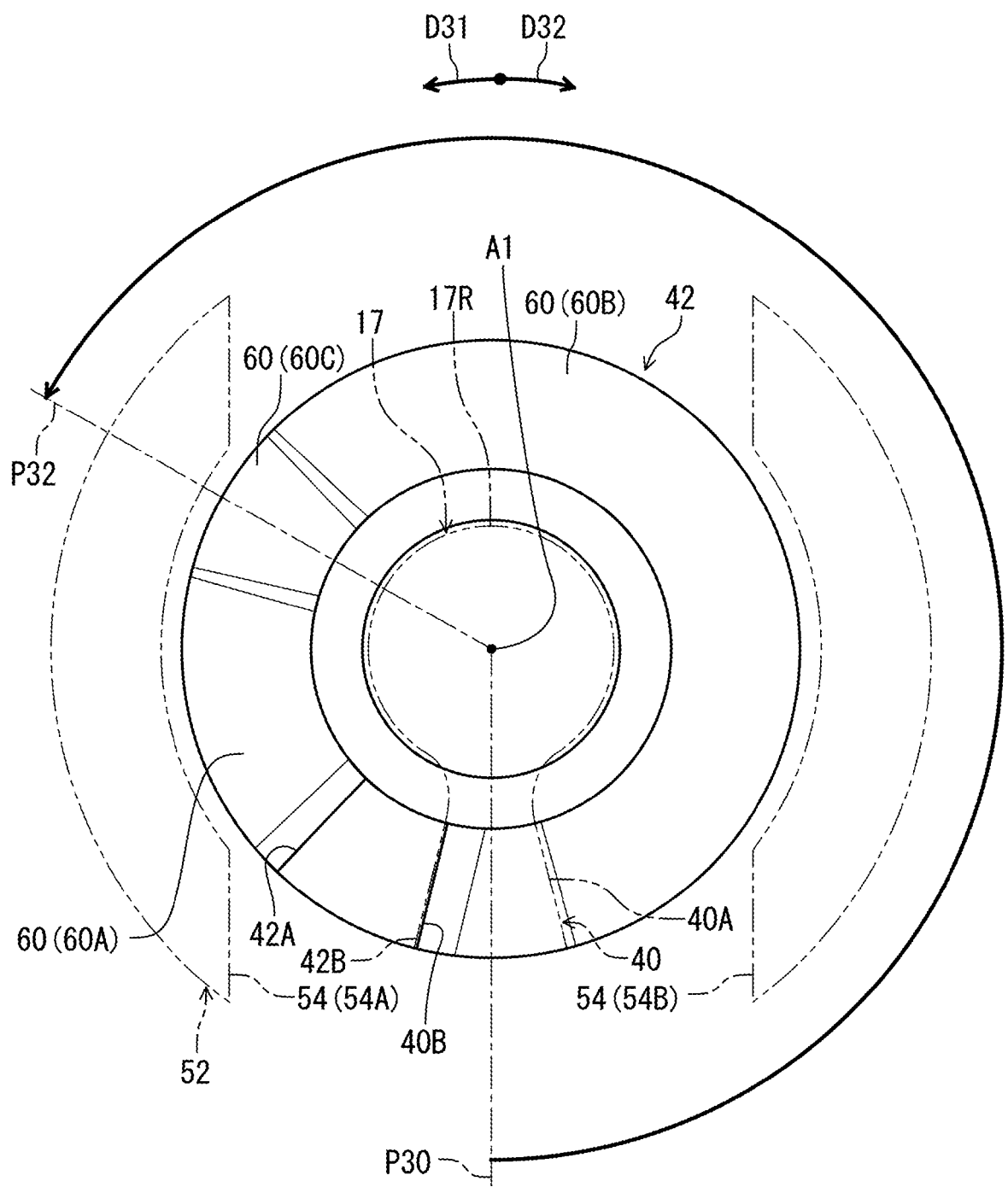
FIG. 16 is a plan view of the cam member of the telescopic apparatus illustrated in FIG. 2 (second actuated position).

As seen in FIG. 16, the cam member 42 is rotatable relatively about the rotational axis A1 from the initial position P30 to a second actuated position P32 to move the cam follower 40 from the third position P20 (see e.g., FIG. 12) to the second position P22 (see e.g., FIG. 12). The cam member 42 is rotatable relative to the base member 52 about the rotational axis A1 from the initial position P30 to the second actuated position P32 to move the cam follower 40 from the third position P20 (see e.g., FIG. 12) to the second position P22 (see e.g., FIG. 12). The cam member 42 is rotatable relative to the base member 52 about the rotational axis A1 from the second actuated position P32 to the initial position P30 to move the cam follower 40 from the second position P22 (see e.g., FIG. 12) to the third position P20 (see e.g., FIG. 12).

Figure 17:
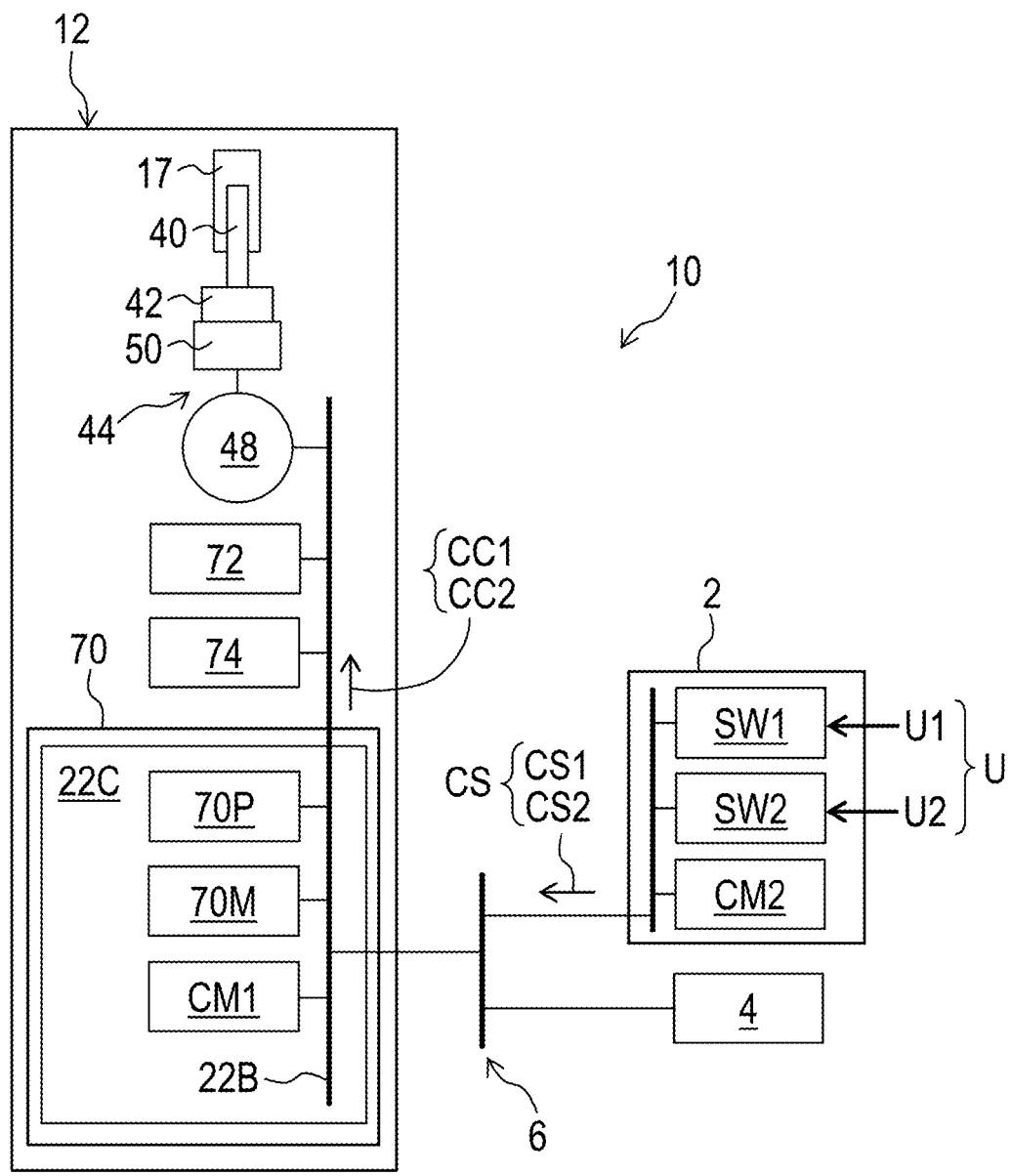
FIG. 17 is a schematic block diagram of the telescopic actuation system illustrated in FIG. 1.

As seen in FIG. 17, the telescopic actuation system 10 includes an operating device 2 and an electric power source 4. The operating device 2 is configured to receive a user input U to generate a control signal CS. In this embodiment, the user input U includes a first user input U1 and a second user input U2. The control signal CS includes a first control signal CS1 and a second control signal CS2.

The operating device 2 includes a first switch SW1 and a second switch SW2. The first switch SW1 is configured to receive a first user input U1 to output a first control signal CS1. The second switch SW2 is configured to receive a second user input U2 to output a second control signal CS2.

For example, the first control signal CS1 indicates the first open state of the hydraulic structure 18. The second control signal CS2 indicates the second open state of the hydraulic structure 18. The first control signal CS1 and the second control signal CS2 are distinguishable from each other. The structure of the operating device 2 is not limited to this embodiment. The operating device 2 can have another structure as long can be adapted to the principle of operation of the telescopic apparatus 12.

In this embodiment, the first switch SW1 is configured to generate the first control signal CS1 while the operating device 2 receives the first user input U1. The second switch SW2 is configured to generate the second control signal CS2 while the operating device 2 receives the second user input U2. However, the first switch SW1 can be configured to generate the first control signal CS1 having a predetermined length regardless of a period of time for which the operating device 2 receives the first user input U1. The second switch SW2 can be configured to generate the second control signal CS2 while the operating device 2 receives the second user input U2.

For example, the operating device 2 is provided at a position (e.g., a handlebar) where the rider can access the operating device 2. The electric power source 4 is mounted on a frame (not shown). For example, the electric power source 4 includes a battery 4A. However, the electric power source 4 can include other components instead of or in addition to the battery 4A.

As seen in FIG. 17, the telescopic apparatus 12 further comprises a controller 70. The controller 70 is configured to be electrically connected to the operating device 2 and the electric power source 4 with an electric cable 6. The controller 70 is configured to receive the first control signal CS1 and the second control signal CS2 from the operating device 2 via the electric cable 6. The controller 70 is configured to be electrically connected to the actuator 44. The electric power source 4 is configured to supply electricity to the operating device 2, the controller 70, and the actuator 44.

The controller 70 is configured to control the cam member 42 so as to rotate in response to the user input U. The controller 70 is configured to control the cam member 42 so as to rotate from the initial position P30 (see e.g., FIG. 15) to the first actuated position P31 (see e.g., FIG. 15) in response to the first user input U1. The controller 70 is configured to control the cam member 42 so as to rotate from the initial position P30 (see e.g., FIG. 16) to the second actuated position P32 (see e.g., FIG. 16) in response to the second user input U2.

The controller 70 is configured to control the actuator 44 so as to rotate the cam member 42 relative to the base member 52 in response to the control signal CS. Namely, the controller 70 is configured to control the actuator 44 so as to move the valve member 17 relative to the base member 52 in response to the control signal CS.

In this embodiment, the controller 70 is configured to control the actuator 44 so as to rotate the cam member 42 relative to the base member 52 from the initial position P30 to the first actuated position P31 in response to the first control signal CS1. The controller 70 is configured to control the actuator 44 so as to move the cam follower 40 relative to the base member 52 from the third position P20 to the first position P21 in response to the first control signal CS1. The controller 70 is configured to control the actuator 44 so as to rotate the cam member 42 relative to the base member 52 from the first actuated position P31 to the initial position P30 in response to a termination of the first control signal CS1. The controller 70 is configured to control the actuator 44 so as to move the cam follower 40 relative to the base member 52 from the first position P21 to the third position P20 in response to the termination of the first control signal CS1. However, the controller 70 can be configured to control the actuator 44 so as to move the cam follower 40 relative to the base member 52 from the first position P21 to the third position P20 when a predetermined period of time elapses after receipt of the first control signal CS1.

The controller 70 is configured to control the actuator 44 so as to rotate the cam member 42 relative to the base member 52 from the initial position P30 to the second actuated position P32 in response to the second control signal CS2. The controller 70 is configured to control the actuator 44 so as to move the cam follower 40 relative to the base member 52 from the third position P20 to the second position P22 in response to the second control signal CS2. The controller 70 is configured to control the actuator 44 so as to rotate the cam member 42 relative to the base member 52 from the second actuated position P32 to the initial position P30 in response to a termination of the second control signal CS2. The controller 70 is configured to control the actuator 44 so as to move the cam follower 40 relative to the base member 52 from the second position P22 to the third position P20 in response to the termination of the second control signal CS2. However, the controller 70 can be configured to control the actuator 44 so as to move the cam follower 40 relative to the base member 52 from the second position P22 to the third position P20 when a predetermined period of time elapses after receipt of the second control signal CS2.

The telescopic apparatus 12 further comprises a communicator CM1 configured to be electrically connected to the controller 70. The operating device 2 includes an additional communicator CM2 configured to electrically connected to the first switch SW1 and the second switch SW2. The communicator CM1 is configured to communicate with the additional communicator CM2 of the operating device 2 via a communication channel. In this embodiment, the communicator CM1 is configured to communicate with the additional communicator CM2 via a wired communication channel. However, the communicator CM1 can be configured to communicate with the additional communicator CM2 via a wireless communication channel. In such a modification, for example, the electric power source 4 can be configured to be directly connected to the telescopic apparatus 12. The communicator CM1 can include a notification unit configured to notify a user of information relating to the communicator CM1. The notification unit can include a light emitting diode (LED) configured to indicate the information relating to the communicator CM1. The information relating to the communicator CM1 can include pairing state (e.g., pairing mode) of the communicator CM1 and/or communication status (e.g., transmission and/or receipt of wireless signals).

The controller 70 includes a processor 70P, a memory 70M, a circuit board 70C, and a system bus 70B. The processor 70P and the memory 70M are electrically mounted on the circuit board 70C. The processor 70P includes a central processing unit (CPU) and a memory controller. The processor 70P is electrically connected to the memory 70M with the circuit board 70C and the system bus 70B. The communicator CM1 is configured to be electrically mounted on the circuit board 70C. The communicator CM1 is electrically connected to the processor 70P and the memory 70M with the circuit board 70C and the system bus 70B.

The memory 70M includes a read only memory (ROM) and a random-access memory (RAM). The memory 70M includes storage areas each having an address in the ROM and the RAM. The processor 70P is configured to control the memory 70M to store data in the storage areas of the memory 70M and reads data from the storage areas of the memory 70M. The memory 70M (e.g., the ROM) stores a program. The program is read into the processor 70P, and thereby the configuration and/or algorithm of the controller 70 and the communicator CM1 is performed.

In this embodiment, the communication channel is established using power line communication (PLC) technology. More specifically, the electric cable 6 includes a ground line and a voltage line. The PLC technology is used for communicating between electric components. The PLC carries data on a conductor that is also used simultaneously for electric power transmission or electric power distribution to the electric components. However, the communication channel can include a wireless communication channel.

As seen in FIG. 17, the actuator 44 includes a position sensor 72 and a motor driver 74. The motor 48 is electrically connected to the position sensor 72 and the motor driver 74. The position sensor 72 is configured to sense that a rotational angle of the cam member 42. Examples of the position sensor 72 include a potentiometer and a rotary encoder. In this embodiment, the position sensor 72 is configured to sense an absolute rotational position of the cam member 42. The motor driver 74 is configured to control the motor 48 based on the control signal CS and the rotational position sensed by the position sensor 72.

The controller 70 is configured to generate a first control command CC1 based on the first control signal CS1. The controller 70 is configured to generate a second control command CC2 based on the second control signal CS2. The first control command CC1 and the second control command CC2 are distinguishable from each other.

In this embodiment, the motor driver 74 is configured to control the motor 48 so as to rotate the cam member 42 relative to the base member 52 from the initial position P30 to the first actuated position P31 in response to the first control command CC1. The motor driver 74 is configured to control the motor 48 so as to rotate the cam member 42 relative to the base member 52 from the first actuated position P31 to the initial position P30 in response to a termination of the first control command CC1.

The motor driver 74 is configured to control the motor 48 so as to rotate the cam member 42 relative to the base member 52 from the initial position P30 to the second actuated position P32 in response to the second control command CC2. The motor driver 74 is configured to control the motor 48 so as to rotate the cam member 42 relative to the base member 52 from the second actuated position P32 to the initial position P30 in response to a termination of the second control command CC2.

The controller 70 can have a wake-up mode in which the controller 70 is configured to control the actuator 44 based on an input signal and a sleep mode in which the controller 70 is suspended under electric power consumption that is lower than electric power consumption in the wake-up mode.

As seen in FIG. 4, the actuator 44 includes an additional base member 76. The telescopic apparatus 12 includes an end member 78. The additional base member 76 is secured to the base member 52. The end member 78 is secured to the first support 22. The additional base member 76 is provided on the end member 78. The circuit board 70C is secured to the additional base member 76. In this embodiment, the controller 70 is provided at the first tube 14. The controller 70 is provided in the first tube 14. However, the controller 70 can be at least partly provided outside the first tube 14 and/or the second tube 16. The controller 70 can be at least partly provided at positions other than the first tube 14. For example, the controller 70 can be at least partly provided at the first tube 14, the second tube 16, the saddle mounting structure MS, and/or an external device.

As seen in FIG. 8, when the controller 70 receives the first control signal CS1 from the operating device 2, the actuator 44 rotates the cam member 42 relative to the base member 52 from the initial position P30 toward the first actuated position P31 in the second circumferential direction D32 about the rotational axis A1. As seen in FIG. 12, the first cam surface 60A of the cam member 42 moves the cam follower 40 relative to the base member 52 from the third position P20 toward the first position P21 in the movement direction D2. The cam member 42 is stopped relative to the base member 52 in the first actuated position P31 when the first stopper 42A comes into contact with the cam follower 40. Thus, as seen in FIG. 3, the valve member 17 is positioned in the first open position P11, allowing the hydraulic fluid to flow between the first hydraulic chamber C1 and the second hydraulic chamber C2 through the passageway PW. Accordingly, the second tube 16 can be moved relative to the first tube 14 in the telescopic direction D1 while the first switch SW1 is pressed by the rider by applying or releasing the rider's weight to or from the second tube 16. The actuator 44 rotates the cam member 42 relative to the base member 52 from the first actuated position P31 to the initial position P30 in response to the termination of the first control signal CS1. Thus, the valve member 17 is returned to the closed position P10.

As seen in FIG. 8, when the controller 70 receives the second control signal CS2 from the operating device 2, the actuator 44 rotates the cam member 42 relative to the base member 52 from the initial position P30 toward the second actuated position P32 in the first circumferential direction D31 about the rotational axis A1. As seen in FIG. 13, the first cam surface 60A of the cam member 42 moves the cam follower 40 relative to the base member 52 from the third position P20 toward the second position P22 in the movement direction D2. The cam member 42 is stopped relative to the base member 52 in the second actuated position P32 when the second stopper 42B comes into contact with the cam follower 40. Thus, as seen in FIG. 3, the valve member 17 is positioned in the second open position P12, allowing the hydraulic fluid to flow between the first hydraulic chamber C1 and the second hydraulic chamber C2 through the passageway PW. Accordingly, the second tube 16 can be moved relative to the first tube 14 in the telescopic direction D1 while the second switch SW2 is pressed by the rider by applying or releasing the rider's weight to or from the second tube 16. The actuator 44 rotates the cam member 42 relative to the base member 52 from the second actuated position P32 to the initial position P30 in response to the termination of the second control signal CS2. Thus, the valve member 17 is returned to the closed position P10.

As seen in FIG. 3, a clearance provided between the valve member 17 and the valve seat 21C in the first open state where the valve member 17 is in the first open position P11 is smaller than a clearance provided between the valve member 17 and the valve seat 21C in the second open state where the valve member 17 is in the second open position P12. Thus, a moving speed of the second tube 16 relative to the first tube 14 in the first open state is lower than a moving speed of the second tube 16 relative to the first tube 14 in the second open state.

In the present application, the term "comprising" and its derivatives, as used herein, are intended to be open ended twins that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A telescopic apparatus for a human-powered vehicle, comprising:
   a first hydraulic chamber;
   a second hydraulic chamber configured to be in fluid communication with the first hydraulic chamber;
   a valve member configured to control the fluid communication between the first hydraulic chamber and the second hydraulic chamber;
   a cam member rotatable about a rotational axis to move the valve member in a movement direction; and
   an actuator configured to rotate the cam member, the actuator including an output shaft rotatable about an actuation rotational axis, the actuation rotational axis being offset from the rotational axis when viewed in the movement direction.

2. The telescopic apparatus according to claim 1, wherein at least one of the rotational axis and the actuation rotational axis extends along the movement direction.

3. A telescopic apparatus for a human-powered vehicle, comprising:
   a first hydraulic chamber;
   a second hydraulic chamber configured to be in fluid communication with the first hydraulic chamber;
   a valve member configured to control the fluid communication between the first hydraulic chamber and the second hydraulic chamber;
   a cam follower coupled to the valve member so as to move the valve member; and
   a cam member rotatable about a rotational axis to guide the cam follower in a movement direction, the cam member including a plurality of cam surfaces configured to arrange the cam follower in one of a first position, a second position, and a third position.

4. The telescopic apparatus according to claim 3, wherein the plurality of cam surfaces circumferentially extends about the rotational axis.

5. The telescopic apparatus according to claim 3, wherein the plurality of cam surfaces includes a first cam surface, and
   the first cam surface is configured to be in contact with the cam follower so as to arrange the cam follower in the first position.

6. The telescopic apparatus according to claim 5, wherein the plurality of cam surfaces includes a second cam surface different from the first cam surface, and
   the second cam surface is configured to be in contact with the cam follower so as to arrange the cam follower in the second position.

7. The telescopic apparatus according to claim 6, wherein the plurality of cam surfaces includes a third cam surface configured to be in contact with the cam follower so as to arrange the cam follower in the third position,
   the first cam surface circumferentially extends from the third cam surface in a first circumferential direction, and
   the second cam surface circumferentially extends from the third cam surface in a second circumferential direction, the second circumferential direction being an opposite direction of the first circumferential direction.

8. The telescopic apparatus according to claim 7, wherein the cam member includes a tubular body rotatable relatively about the rotational axis, and
   the first cam surface, the second cam surface, and the third cam surface are provided on an axial end of the tubular body.

9. The telescopic apparatus according to claim 8, wherein the cam member includes a first stopper extending from the axial end of the tubular body, and
   the first stopper is configured to be in contact with the cam follower to stop the cam follower in the first position.

10. The telescopic apparatus according to claim 8, wherein
    the cam member includes a second stopper extending from the axial end of the tubular body, and
    the second stopper is configured to be in contact with the cam follower to stop the cam follower in the second position.

11. The telescopic apparatus according to claim 3, wherein
    a first distance defined between the first position and the third position in the movement direction is shorter than a second distance defined between the second position to the third position in the movement direction.

12. The telescopic apparatus according to claim 3, wherein
the valve member includes a rod body extending along the movement direction, and
the cam follower protrudes radially outwardly from the rod body.

13. The telescopic apparatus according to claim 1, wherein
the actuator includes a base member, and
the base member is configured to accommodate at least a part of the cam member and at least a part of the valve member.

14. The telescopic apparatus according to claim 13, wherein
the base member includes a base member surface configured to be at least partially in contact with the valve member, and
the valve member includes a valve member surface configured to be at least partially in contact with the base member surface such that a rotation of the valve member relative to the base member is restricted.

15. The telescopic apparatus according to claim 14, wherein,
the base member surface includes a base member flat surface, and
the valve member surface includes a valve member flat surface configured to be in contact with the base member flat surface.

16. The telescopic apparatus according to claim 3, further comprising
a controller configured to control the cam member so as to rotate in response to a user input.

17. The telescopic apparatus according to claim 16, wherein
the cam member is rotatable relatively about the rotational axis from an initial position to a first actuated position to move the cam member from the third position to the first position, and
the controller is configured to control the cam member so as to rotate from the initial position to the first actuated position in response to a first user input.

18. The telescopic apparatus according to claim 17, wherein
the cam member is rotatable relatively about the rotational axis from the initial position to a second actuated position to move the cam member from the third position to the second position, and
the controller is configured to control the cam member so as to rotate from the initial position to the second actuated position in response to a second user input.

* * * * *